(12) United States Patent
Yeh et al.

(10) Patent No.: US 12,423,300 B2
(45) Date of Patent: Sep. 23, 2025

(54) ERROR-BOUNDED APPROXIMATE TIME SERIES JOIN USING COMPACT DICTIONARY REPRESENTATION OF TIME SERIES

(71) Applicant: Visa International Service Association, San Francisco, CA (US)

(72) Inventors: Michael Yeh, Newark, CA (US); Yan Zheng, Los Gatos, CA (US); Junpeng Wang, Santa Clara, CA (US); Wei Zhang, Fremont, CA (US); Zhongfang Zhuang, Mountain View, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/567,717

(22) PCT Filed: Jun. 1, 2022

(86) PCT No.: PCT/US2022/031792
§ 371 (c)(1),
(2) Date: Dec. 6, 2023

(87) PCT Pub. No.: WO2022/260906
PCT Pub. Date: Dec. 15, 2022

(65) Prior Publication Data
US 2024/0273095 A1 Aug. 15, 2024

Related U.S. Application Data

(60) Provisional application No. 63/197,854, filed on Jun. 7, 2021.

(51) Int. Cl.
*G06F 16/2453* (2019.01)
*G06F 16/2458* (2019.01)

(52) U.S. Cl.
CPC .... *G06F 16/24537* (2019.01); *G06F 16/2465* (2019.01); *G06F 16/2477* (2019.01)

(58) Field of Classification Search
None
See application file for complete search history.

(56) References Cited

U.S. PATENT DOCUMENTS 10,853,372 B1  12/2020  Mueen et al.
2019/0129821 A1*  5/2019  Lee ..................... G06F 11/3452
(Continued)

OTHER PUBLICATIONS

Yeh , "Towards a Near Universal Time Series Data Mining Tool Introducing the Matrix Profile", Cornell University Library, Nov. 5, 170 pages. (Year: 2018).*

(Continued)

*Primary Examiner* — Kannan Shanmugasundaram
(74) *Attorney, Agent, or Firm* — Kilpatrick Townsend & Stockton LLP

(57) ABSTRACT

A method is disclosed. The method comprises determining a time series, a subsequence length. The length of the time series may then be determined, and an initial matrix profile may then be computed. The method may then form a processed matrix profile for a first subsequence of the subsequence length by applying the first subsequence to the initial matrix profile. A second subsequence may then be determined from the processed matrix profile. The method may then include comparing the second subsequence to other subsequences in a dictionary and adding it to the dictionary. The subsequences in the dictionary may be used to generate a plurality of subsequence matrix profiles. The method may then include forming an approximate matrix profile using the plurality of subsequence matrix profiles and then determining one or more anomalies in the time series or another time series using the approximate matrix profile.

18 Claims, 23 Drawing Sheets

(56) References Cited

U.S. PATENT DOCUMENTS

| | | | |
|---|---|---|---|
| 2019/0227504 A1 | 7/2019 | Ma et al. | |
| 2019/0310927 A1 | 10/2019 | Masuzaki et al. | |
| 2020/0257686 A1* | 8/2020 | Law | G06F 16/2456 |
| 2020/0258157 A1 | 8/2020 | Law | |
| 2020/0301405 A1 | 9/2020 | Zhang et al. | |
| 2021/0042382 A1 | 2/2021 | Freeman et al. | |

OTHER PUBLICATIONS

PCT/US2022/031792 , "International Search Report and Written Opinion", Sep. 20, 2022, 11 pages.

Zhu et al., "Matrix Profile XI: SCRIMP++: Time Series Motif Discovery at Interactive Speeds", IEEE International Conference on Data Mining (ICDM), Nov. 2018, 10 pages.

Zimmerman et al. "Matrix Profile XVIII: Time Series Mining in the Face of Fast Moving Streams using a Learned Approximate Matrix Profile", IEEE International Conference on Data Mining (ICDM), Nov. 2019, 10 pages.

Alshaer et al., "Detecting Anomalies From Streaming Time Series Using Matrix Profile and Shapelets Learning", 2020 Institute of Electrical and Electronics Engineers 32nd International Conference on Tools with Artificial Intelligence (ICTAI), Nov. 9, 2020, pp. 376-383.

EP22820784.1 , "Extended European Search Report", Sep. 24, 2024, 7 pages.

Saadat et al., "Explaining Differences in Classes of Discrete Sequences", 2020 Institute of Electrical and Electronics Engineers/WIC/Association for Computing Machinery International Joint Conference on Web Intelligence and Intelligent Agent Technology (WI-TAT), Dec. 14, 2020, pp. 129-136.

Yeh , "Towards a Near Universal Time Series Data Mining Tool: Introducing the Matrix Profile", Cornell University Library, Nov. 5, 2018, 170 pages.

* cited by examiner

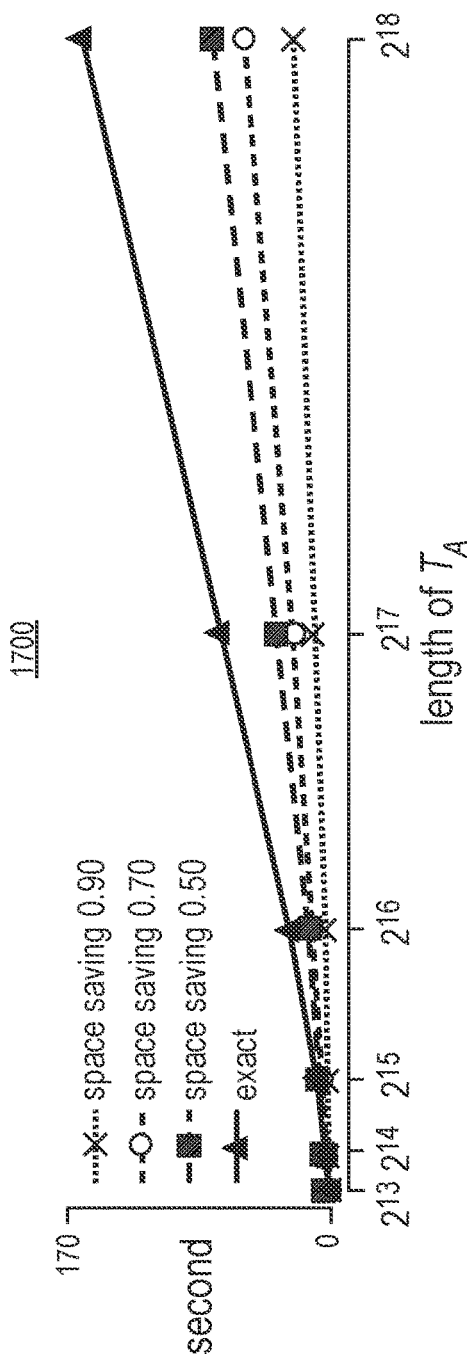
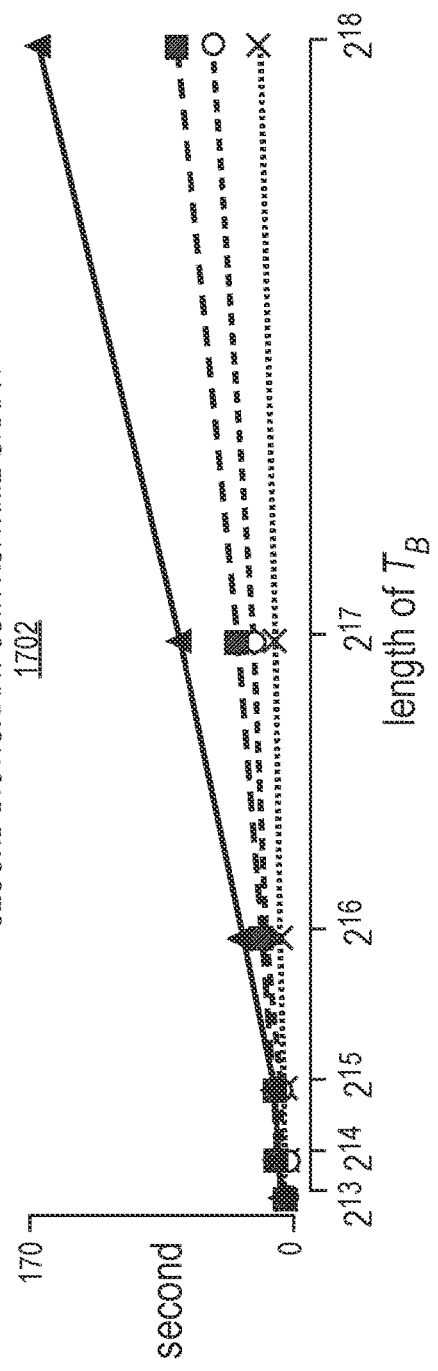
FIG. 17

```
ALGORITHM 1: DICTIONARY LEARNING
                  2200
INPUT: time series T_B, subsequence length m, contextual window
factor k
OUTPUT: dictionary D_B
1  function LearnDictionary(T_B, m, k)
2      n ← GetArraySize(T_B)
3      P_B ← T_B ▷◁_{θ1NN,m} T_B
4      S ← GetZeroArraySize(n - m + 1)
5      D_B ← ∅
6      while True do
7          P'_B ← P_B - S
8          for each subsequence in D_B do
9              i ← GetStartIndex(D_B)
10             i ← i + m(k - 1) / 2
11             P'_B [i - m/2 : i + m/2] ← ∞
12         j ← arg min P'_B
13         D_B ← T_B[j - m(k - 1)/2 : j + m(k+1)/2]
14         if terminal condition is True then
15             break
16         S' ← GetDistanceProfile(TB, TB[j : j + m])
17         if S is zero vector then
18             S ← S'
19         else
20             S ← ElementwiseMin(S, S')
21     return D_B
```

FIG. 22

ALGORITHM 2: SIMILARITY JOIN WITH DICTIONARY
2300

INPUT: time series $T_A$, dictionary $D_B$, subsequence length m
OUTPUT: matrix profile $\hat{P}_{AB}$ 1  function LearnDictionary($T_A$, $D_B$, m)
2      n ← GetArraySize($T_A$)
3      $P_{AB}$ ← GetInfArrayOfSize(n - m + 1)
4      for each subsequence in $D_B$ do
5          $P_{AD}$ ← $T_B \bowtie_{\theta 1NN,m} T_B$
6          $\hat{P}_{AB}$ ← ElementwiseMin($\hat{P}_{AB}$, $P_{AD}$)
7      return $\hat{P}_{AB}$

FIG. 23

ERROR-BOUNDED APPROXIMATE TIME SERIES JOIN USING COMPACT DICTIONARY REPRESENTATION OF TIME SERIES

CROSS-REFERENCES TO RELATED APPLICATIONS

This application is a National Stage of International Application No. PCT/US2022/031792, filed on Jun. 1, 2022, which claims priority to and the benefit of U.S. Provisional Patent Application No. 63/197,854, filed on Jun. 7, 2021 which is herein incorporated by reference.

BACKGROUND

Matrix profile is a data mining tool that provides similarity join functionality for time series data. Users of the matrix profile can either similarity join a time series with itself using an intra-similarity join (i.e., a self-join) or join a time series with another time series using an inter-similarity join. By invoking either, or both, types of joins, the matrix profile can help users discover conserved or anomalous structures, or segment time series into semantically meaningful regimes. Methods to improve the computation speed and efficiency of approximate inter-similarity joins are desirable.

Embodiments of the disclosure address this problem and other problems individually and collectively.

SUMMARY

One embodiment of the invention includes a method. The method comprises: a) determining, by a server computer, a time series corresponding to time-dependent events; b) determining, by the server computer, a subsequence; c) determining a length of the time series; d) computing, by the server computer, an initial matrix profile using the time series; e) forming, by the server computer, a processed matrix profile for a first subsequence of the subsequence length by applying the first subsequence to the initial matrix profile; f) determining, by the server computer, a second subsequence from the processed matrix profile; g) adding, by the server computer, the determined second subsequence to a dictionary comprising a plurality of subsequences in the time series; h) generating, by the server computer, a plurality of subsequence matrix profiles by applying the plurality of subsequences in the dictionary to the time series or another time series; i) forming, by the server computer, an approximate matrix profile using the plurality of subsequence matrix profiles; and j) determining one or more anomalies in the time series or the another time series using the approximate matrix profile.

Another embodiment of the invention includes a server computer. The server computer comprises: a processor; and a non-transitory computer readable medium comprising instructions executable by the processor to perform operations including: a) determining a time series corresponding to time-dependent events; b) determining a subsequence length; c) determining a length of the time series; d) computing an initial matrix profile using the time series; e) forming a processed matrix profile for a first subsequence of the subsequence length by applying the first subsequence to the initial matrix profile; f) determining a second subsequence from the processed matrix profile; g) adding the determined second subsequence to a dictionary comprising a plurality of subsequences in the time series; h) generating a plurality of subsequence matrix profiles by applying the plurality of subsequences in the dictionary to the time series or another time series; i) forming an approximate matrix profile using the plurality of subsequence matrix profiles; and j) determining one or more anomalies in the time series or the another time series using the approximate matrix profile.

These and other embodiments are described in further detail below.

A better understanding of the nature and advantages of embodiments of the invention may be gained with reference to the following detailed description and accompanying drawings.

BRIEF DESCRIPTION OF THE DRAWINGS

FIG. 17 shows first and second dictionary join runtime graphs of runtime vs. time series length for various spacing factors according to embodiments.

FIG. 22 shows pseudocode for an exemplary dictionary learning algorithm according to an embodiment.

FIG. 23 shows pseudocode for an exemplary similarity join algorithm according to an embodiment.

DETAILED DESCRIPTION

Prior to discussing embodiments of the disclosure, some terms can be described in further detail.

A "time dependent event" may be something that occurs at a specific time. In some embodiments, a time dependent event may be represented by a value and a timestamp. Some examples of time dependent events include a car passing through a toll gate, an electronic signal that causes a heartbeat, data associated with a purchase transaction, etc. In the example of a heartbeat, an electrocardiogram (ECG) machine may be used to measure the voltage of the electronic signal that causes a heartbeat at several time intervals.

A "time series" may be a series of time dependent events. In some embodiments, a time series may be formed by detecting time dependent events at successive and possibly equally spaced points in time. One example of such a time series can include heartbeat activity time series that is measured by an electrocardiogram machine, which measures voltage at closely spaced points of time (e.g., a time series formed by measuring voltage every millisecond). In some embodiments, a time series can be formed using aggregates of data that occur within a range of time. One example of such a time series can include a traffic data time series, which may be formed by aggregating the amount of cars that passed a toll gate between a first time period and a second time period (e.g., a time series formed by aggregating the cars passing a toll gate every 10 minutes). In some embodiments, a time series may be implemented using a list, an array, or any other suitable form of grouped data. Mathematically, a time series $T \in \mathbb{R}^n$ is a sequence of real valued numbers $t_i \in \mathbb{R} : T=[t_1, t_2, \ldots, t_n]$ where n is the length of T.

A "sequence length" may be the length of a sequence. In some examples, a "sequence length" may be a "subsequence length" of a subsequence. For example, a time series with 1,000 datapoints may have a sequence length of 1,000. A subsequence of 100 datapoints of the time series may have a subsequence length of 100.

A "matrix profile" may be a matrix of distances of a time series. For example, given a first time series $T_A$, a time series $T_B$, and subsequence length m, a matrix profile $P_{AB}$ is a vector of the distances or similarities between each pair in $J_{AB,m}$. In the following, this operation is denoted formally as $P_{AB} = T_A \bowtie_{\theta_{1NN,m}} T_B$.

A "dictionary" may be a resource that lists things. In some embodiments, a dictionary may list subsequences of a time series. For example, a dictionary may store one or more subsequences found in a time series.

Figure 1:
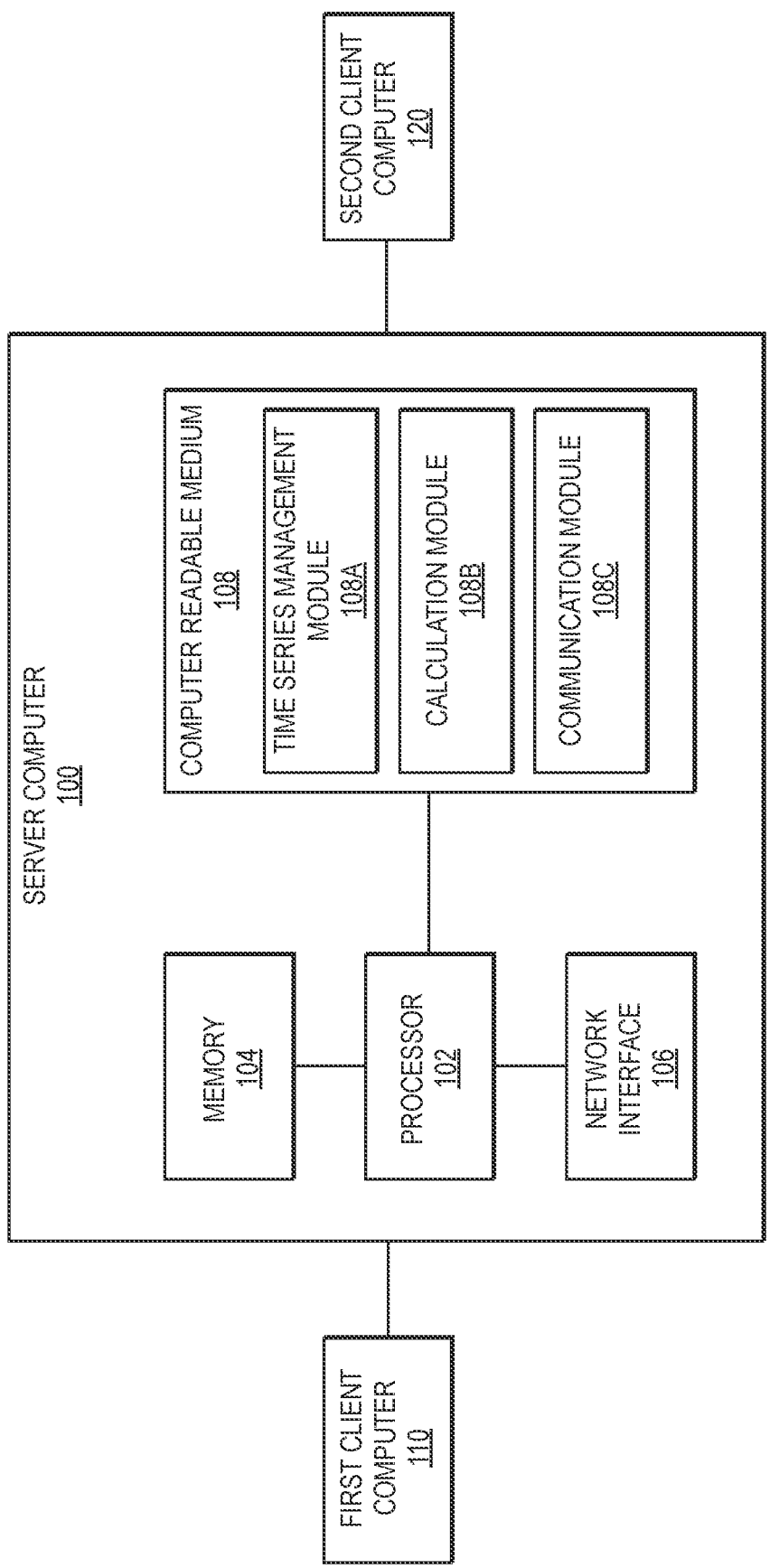
FIG. 1 shows a system according to embodiments.

FIG. 1 shows a system according to embodiments. The system comprises a server computer 100, a first client computer 110, and a second client computer 120. The server computer 100 may comprise a processor 102, which may be coupled to a memory 104, a network interface 106, and a non-transitory computer readable medium 108. In some embodiments, the server computer 100 may be operated by a processing network.

The first client computer 110 may be operated by a first user. In some embodiments, the first client computer 110 may provide a list of time dependent events to the server computer 100. For example, the first client computer 110 can operate an electrocardiogram machine that records the voltage of a heartbeat. The first client computer 110 may provide electrocardiogram data to the server computer 100.

The second client computer 120 may be operated by a second user. The second client computer 120 may receive an output from the server computer 100, and the output may be evaluated by the second user.

The components in the system of FIG. 1 and any of the following figures can be in operative communication with each other through any suitable communications medium. Suitable examples of the communications medium may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices of FIG. 1 may be transmitted using a secure communications protocol such as, but not limited to, File Transfer Protocol (FTP); HyperText Transfer Protocol (HTTP); and Secure Hypertext Transfer Protocol (HTTPS).

The memory 104 may be coupled to the processor 102 internally or externally (e.g., via cloud-based data storage), and may comprise any combination of volatile and/or non-volatile memory such as RAM, DRAM, ROM, flash, or any other suitable memory device. The memory 104 may store time series data.

The network interface 106 may include an interface that can allow the server computer 100 to communicate with external computers and/or devices. The network interface 106 may enable the server computer 100 to communicate data to and from another device such as a client computer. Some examples of the network interface 106 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 106 may include Wi-Fi. Data transferred via the network interface 106 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 106 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 108 may comprise code, executable by the processor 102, for a method comprising: a) determining, by a server computer, a time series corresponding to time-dependent events; b) determining, by the server computer, a subsequence length; c) determining a length of the time series; d) computing, by the server computer, an initial matrix profile using the time series; e) forming, by the server computer, a processed matrix profile for a first subsequence of the subsequence length by applying the first subsequence to the initial matrix profile; f) determining, by the server computer, a second subsequence from the processed matrix profile; g) adding, by the server computer, the determined second subsequence to a dictionary comprising a plurality of subsequences in the time series; h) generating, by the server computer, plurality of subsequence matrix profiles by applying the plurality of subsequences in the dictionary to the time series or another time series; i) forming, by the server computer, an approximate matrix profile using the plurality of subsequence matrix profiles; and j) determining one or more anomalies in the time series or another time series using the approximate matrix profile.

The computer readable medium 108 may comprise a number of software modules including, but not limited to, an time series management module 108A, a computation module 108B, and a communication module 108C.

The time series management module 108A may comprise code that causes the processor 102 to operate on time series data. For example, the time series management module 108A may allow the processor 102 to form time series data from time dependent events received by the server computer 100 from an external device. The time series management module 108A may be used to perform both inter-similarity joins and intra-similarity joins of time series.

The computation module 108B may comprise code that causes the processor 102 to perform computations. For example, the computation module 108B may allow the processor 102 to compute a distance profile of a time series and a query, to determine a minimum value of a set of a matrix profiles, etc.

The communication module 108C may comprise code that causes the processor 102 to generate messages, forward messages, reformat messages, and/or otherwise communicate with other entities.

A "matrix profile" can be a time series data mining tool that can be used to solve a variety of problems including time series motif or discord discovery, time series semantic segmentation, and time series shapelet discovery. These problems may be solved by performing either or both of an intra-similarity join or an inter-similarity join that are defined for the matrix profile. The intra-similarity join (also commonly known as a self-join) captures the nearest neighbor relationship among subsequences within a given time series. The inter-similarity join captures the nearest neighbor relationship from one set of subsequences to another set, where each subsequence set comes from different time series.

A fast approximated inter-time series similarity join method with proofed error bound is proposed, including a learning phase and an inference phase. During the learning phase, a compact representative dictionary to capture local patterns within the time series is created. A compact dictionary for a dataset can exploit the fact that many time series datasets contain significant redundancies, which can be described with reference to FIGS. 2 and 3. The area under the curve of a matrix profile (as in FIG. 3) can be seen as a measure of the redundancy. In the inference phase, a similarity join can be applied to any given time series with compact dictionaries instead of the original time series. As the dictionary is much smaller than the original time series, the similarity join can be performed more efficiently as compared to performing the similarity join with the original time series.

Figure 2:
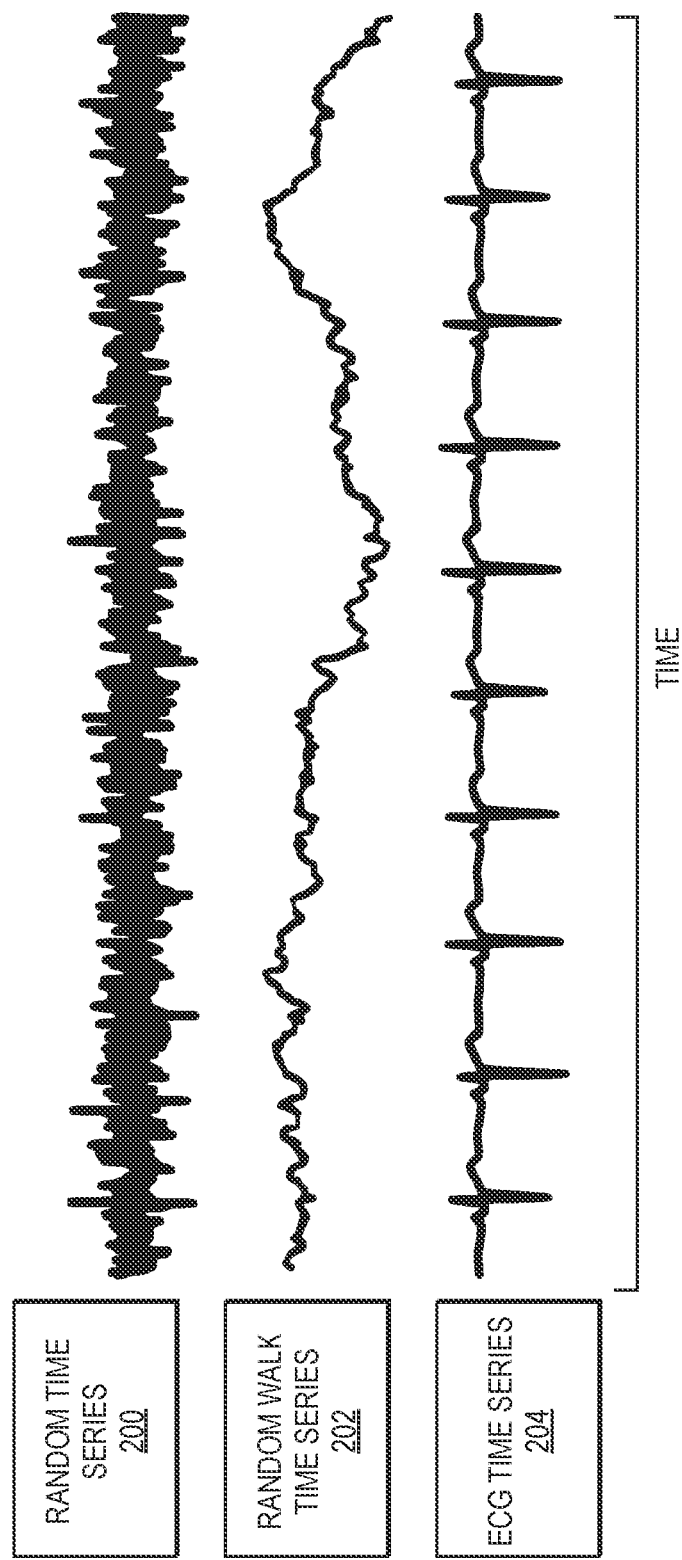
FIG. 2 shows a random time series, a random walk time series, and an electrocardiogram time series according to embodiments.

FIG. 2 shows a random time series 200, a random walk time series 202, and an electrocardiogram (ECG) time series 204 according to embodiments. The random time series 200 can be generated by generating random values (e.g., using a random number generator or pseudorandom number generator) and assigning a timestamp for each random value. The random walk time series 202 can be generated by beginning with an initial value (e.g., starting at zero), and for a number of time steps, randomly increasing or decreasing the previous value by a set amount (e.g., increase or decrease by one). The electrocardiogram time series 204 can be generated using an electrocardiogram machine to measure the voltage of an individual at a number of time steps.

Figure 3:
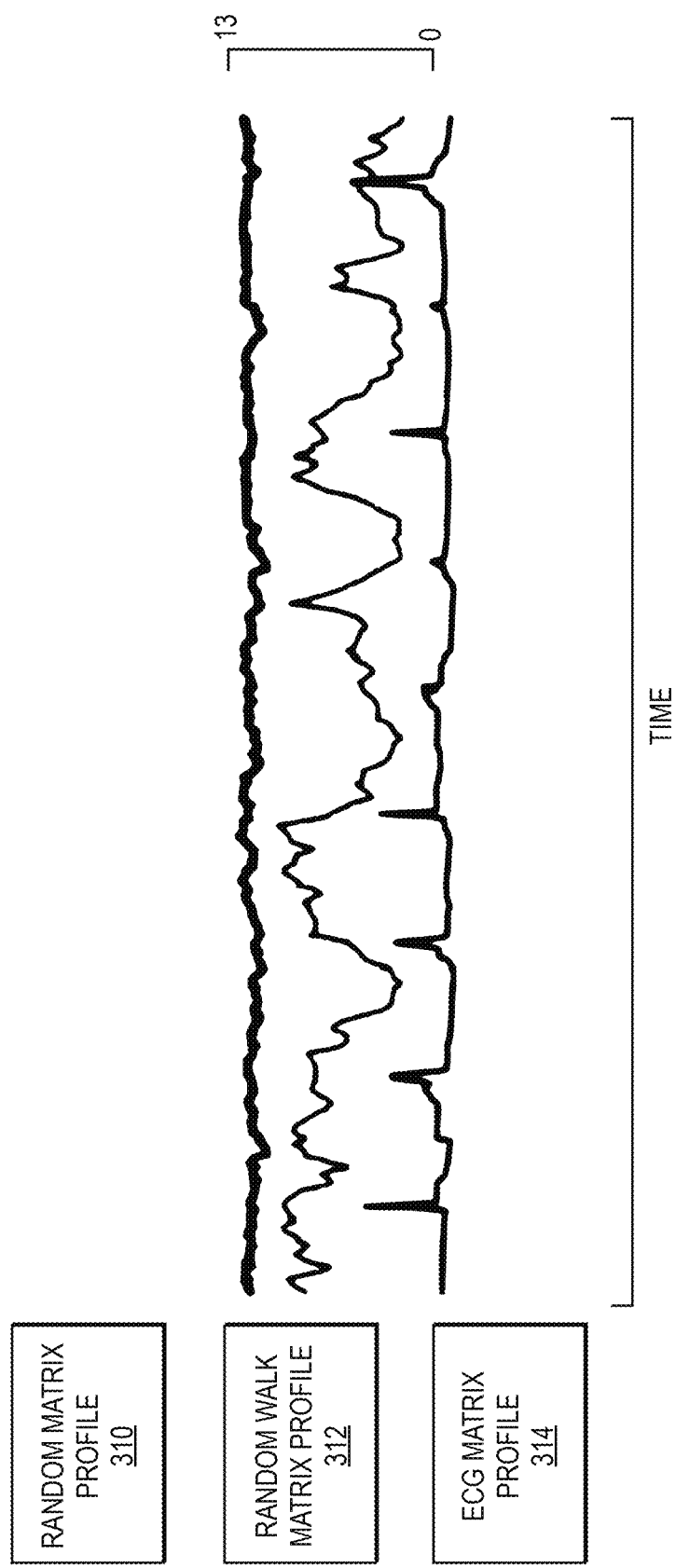
FIG. 3 shows three matrix profiles according to embodiments.

FIG. 3 shows three matrix profiles according to embodiments. The random time series 200 has a corresponding random matrix profile 310, the random walk time series 202 has a corresponding random walk matrix profile 312, and the electrocardiogram time series 204 has a corresponding electrocardiogram matrix profile 314. The area under the curve for each matrix profile can be seen as a measure of the compressibility of each time series (e.g., how compactly can a dictionary represent the original time series). A matrix profile of a time series allows a simple and effective time series anomaly detection method. In particular, the highest point in a matrix profile is called the time series discord. By definition, discords are not similar to any other subsequence in the time series of the matrix profile. Several definitions follow.

Definition 1: A time series $T \in \mathbb{R}^n$ is a sequence of real valued numbers $t_i \in \mathbb{R}$: $T=[t_1, t_2, \ldots, t_n]$ where n is the length of T.

Definition 2: A subsequence $T_{i,m} \in \mathbb{R}^m$ of a time series T is a length m contiguous subarray of T starting from position i. Formally, a subsequence is denoted by $T_{i,m}=[t_i, t_{i+1}, \ldots, t_{i+m-1}]$.

Definition 3: An all-subsequences set $A_m$ of a time series T is an ordered set of all possible subsequences of T obtained by sliding a window of length m across T: $A_m=\{T_{1,m}, T_{2,m}, \ldots, T_{n-m+1,m}\}$, where m is a user-defined subsequence length. $A_m[i]$ is used to denote $T_{i,m}$.

Definition 4: A distance profile S is a vector of the distances (or similarities) between a given query $Q \in \mathbb{R}^m$ and each subsequence $A_m[i]$ in an all-subsequences set $A_m$ of time series T. The distance profile can be computed given a time series of length m and computing its distance with each subsequence $A_m[i] \in A_m$. The distance profile S can be used to store the result distances. The most common distance function used for distance profile computation is the z-normalized Euclidean distance. Other distance functions can include bounded similarity functions and use a Pearson correlation coefficient. The distance profile S can be considered a meta time series that annotates the time series T that was used to generate all-subsequences set $A_m$. An exemplary distance profile is shown in FIG. 4.

Figure 4:
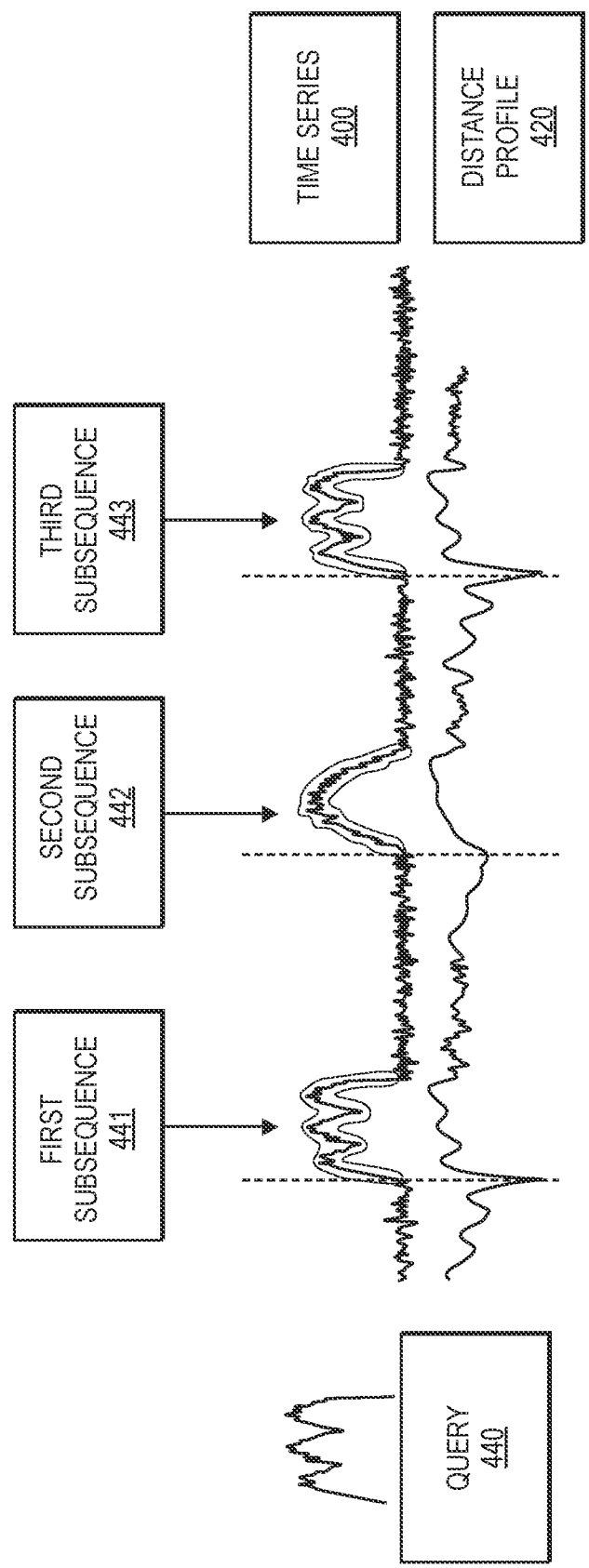
FIG. 4 shows a distance profile of a time series and a query according to embodiments.

FIG. 4 shows a distance profile 420 of a time series 400 and a query 440 according to embodiments. A subsequence of the time series 400 can be used as the query 440. The query 440 is compared to every subsequence of the time series 400. The resultant comparison is stored as the distance profile 420. The subsequences that are more similar to the query 440 are the first subsequence 441 and the third subsequence 443. The second subsequence 442 in the time series 400 is less similar to the query 440 than the two subsequences.

Time series similarity joins concern the nearest neighbor (i.e., 1NN) relation between subsequences; therefore, a 1NN-join function which indicates the nearest neighbor relation between the two input subsequences is defined.

Definition 5: Given two all-subsequences sets $A_m$ and $B_m$ and two subsequences $A_m$ [i] and $B_m$ [j], a 1NN-join function $\theta_{1NN}(A_m[i], B_m[j])$ is a Boolean function which returns True only if $B_m$ [j] is the nearest neighbor of $A_m$ [i] in the set $B_m$.

With the defined 1NN-join function, a similarity join set can be generated by applying the similarity join operator on two input all-subsequences sets.

Definition 6: Given all-subsequences sets $A_m$ and $B_m$ of time series $T_A$ and $T_B$, a similarity join set $J_{AB,m}$ of $A_m$ and $B_m$ is a set containing pairs of each subsequence in $A_m$ with its nearest neighbor in $B_m$: $J_{AB,m} = \{(A_m[i], B_m[j]) \mid \theta_{1NN}(A_m[i], B_m[j])\}$.

The distance, or similarity, between each pair within a similarity join set is measured and stored into a matrix profile.

Definition 7: Given a first time series $T_A$, a second time series $T_B$, and subsequence length m, a matrix profile $P_{AB}$ is a vector of the distances or similarities between each pair in $J_{AB,m}$. The operation is denoted formally as $P_{AB} = T_A \rhd\!\!\lhd \theta_{1NN,m} T_B$. As the first time series $T_A$ and the second time series $T_B$ can either be the same time series (e.g., intra-similarity join) or two different time series (e.g., inter-similarity join), there are two types of time series similarity join algorithms.

Figure 5:
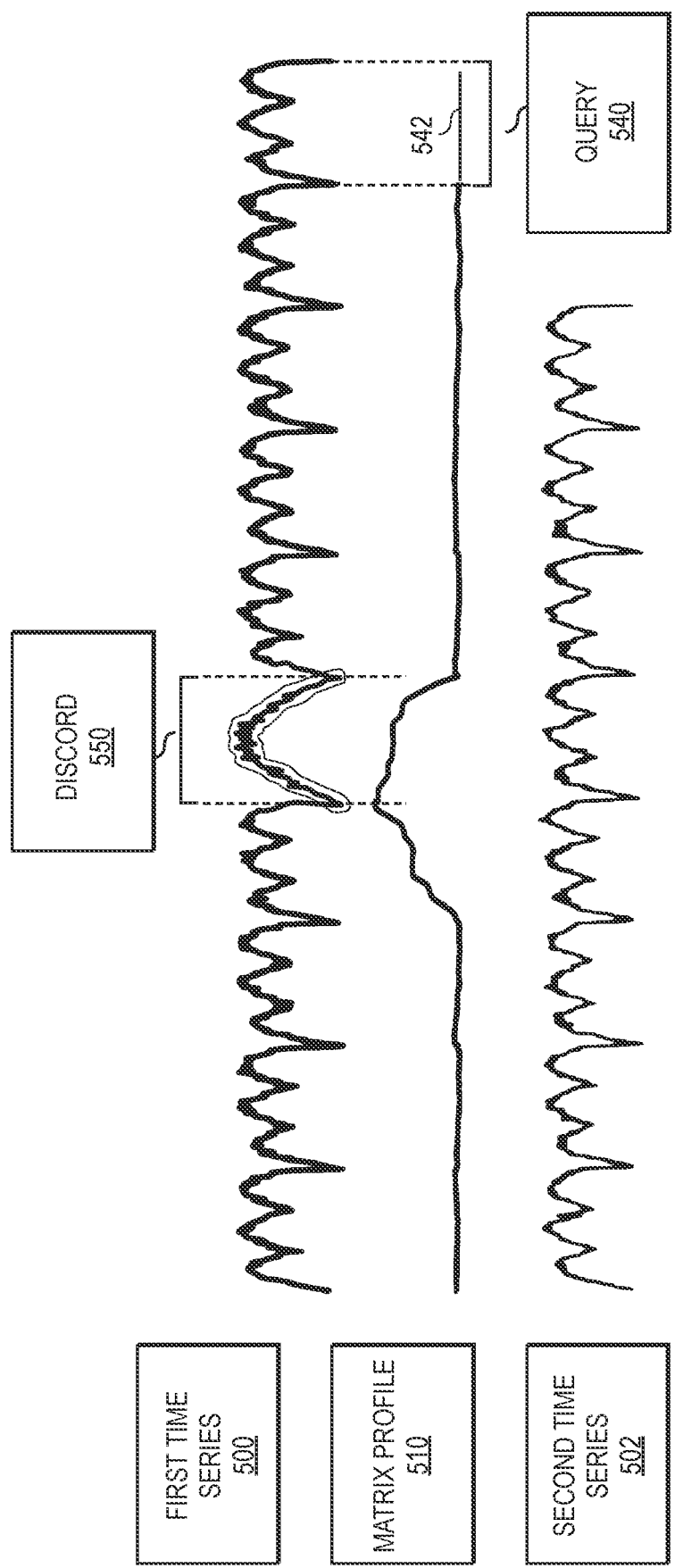
FIG. 5 shows a matrix profile of an inter-similarity join of two time series according to embodiments.

FIG. 5 shows a matrix profile 510 of an inter-similarity join of two time series according to embodiments. The matrix profile 510 is generated using a first time series 500 and a second time series 502. A subsequence length may be chosen to select a query 540 from the first time series 500. The query 540 can be compared to each subsequence of the second time series 502 to produce a distance profile for the query 540. A similar process can be performed for every possible choice of the query 540 in the first time series 500 to calculate a distance profile for each choice of query 540. The distance profiles of all the queries may then be combined using an element-wise minimum function such that the minimum value of all of the distance profiles at each point may be used as a corresponding point in the matrix profile 510. As an example, if there are three subsequences in a time series resulting in three distance profiles [0, 7, 4, 6, 2, 9, 2], [3, 5, 32, 83, 21, 21, 21], and [12, 14, 15, 1, 5, 6], the element-wise minimum function would result in a matrix profile of [0, 5, 4, 6, 1, 5, 2].

Just as with the distance profile, the matrix profile can also be considered a meta time series that annotates time series. For example, if an all-subsequences set $A_m$ is extracted from the first time series 500 and an all-subsequences set $B_m$ is extracted from the second time series 502, the nearest neighbor (i.e., the most similar subsequence) for each subsequence in the first time series 500 is found in the second time series 502. The resultant matrix profile 510 annotates the first time series 500 with each subsequence's nearest neighbor distance in the second time series 502. The matrix profile 510 reveals the similarity and differences from the perspective of the first time series 500. The discord 550 identifies a subsequence in the first time series 500 that is most significantly different from the time series 502.

To efficiently compute inter-similarity join matrix profiles, a compact dictionary representation is desired. A compact dictionary representation $D_B$ for $T_B$ such that $|P_{AB} - \hat{P}_{AB}|$ can be minimized for any given time series $T_A$ where $P_{AB} = T_A \rhd\!\!\lhd \theta_{1NN,m} T_B$, $\hat{P}_{AB} = \rhd\!\!\lhd \theta_{1NN,m} D_B$, and $\|\cdot\|$ denotes the vector norm. Additionally, a no false negative guarantee and a max error guarantee is desired. It is desirable that the approximate solution (e.g., the solution using the compact dictionary) captures all potential time series discord (e.g., all anomalies). To achieve this, the approximate nearest neighbor distance for any subsequence in $T_A$ cannot be closer than the true nearest neighbor distance. The two guarantees are discussed below.

Guarantee 1: Given that $P_{AB}$ and $\hat{P}_{AB}$ are defined using distance measure, no false negative guarantee requires $\hat{P}_{AB}$ [i]$\geq P_{AB}$ [i] for all i and for any given $T_A$.

Note, if $P_{AB}$ and $\hat{P}_{AB}$ are defined using a similarity measure such as the Pearson correlation coefficient, $\hat{P}_{AB}$ [i]$\leq P_{AB}$ [i] for all i, satisfying this property allows many downstream higher-level algorithms to use the approximate results, yet produce exact answers.

Guarantee 2: Given $T_B$ and $D_B$, max error guarantee requires the existence of an error bound $e_{max} \in \mathbb{R}$ such that $|\hat{P}_{AB}[i] - P_{AB}[i]| \leq e_{max}$ for all i and for any given $T_A$.

Such an error-bound can either be used in a stopping criterion if the dictionary is built greedily, or provide confidence to the approximate solution for downstream tasks. Considering time series discord (e.g., the subsequence with the largest matrix profile value within a given time series) discovery as an example, if the largest approximate matrix profile value $\hat{P}_{AB}$ [i] and the second largest approximate matrix profile value $\hat{P}_{AB}$ [j] have a difference greater than $e_{max}$, then the subsequence associated with $\hat{P}_{AB}$ [i] is guaranteed to be the time series discord of $T_A$. To demonstrate why the statement is true, given Guarantee 1, the error for $\hat{P}_{AB}$ [i] and $\hat{P}_{AB}$ [j] is defined as:

$$e_i \triangleq \hat{P}_{AB}[i] - P_{AB}[i] \qquad ()$$
$$e_j \triangleq \hat{P}_{AB}[j] - P_{AB}[j]$$

With algebraic manipulation, Equation becomes:

$$P_{AB}[i] = \hat{P}_{AB}[i] - e_i \qquad ()$$
$$P_{AB}[j] = \hat{P}_{AB}[j] - e_j$$

Because of Guarantee 2, both $e_i$ and $e_j$ are non-negative numbers bounded above by $e_{max}$. Given that $\hat{P}_{AB}$ [i]$>\hat{P}_{AB}$ [j], $P_{AB}$ [j] can only be greater than $P_{AB}$ [i] if $e_i > e_{max}$ even if $e_j$ is 0. However, since $e_i > e_{max}$ contradicts Guarantee 2, $P_{AB}$ [i] must be the time series discord of $T_A$. As noted in Guarantee 2, if the main focus is on time series discords, under some circumstances it is possible to exploit the approximate results from the dictionary join to produce an overall exact answer to discord questions.

As described above, the approximate inter-similarity join algorithm has two stages: 1) dictionary learning and 2) similarity join. The dictionary learning algorithm constructs a compact dictionary representation from a time series in the first stage, then, any incoming time series subsequence can efficiently join with the dictionary instead of the original time series in the second stage.

The dictionary learning algorithm is designed based on two heuristics: 1) time series motifs are the more representative subsequences, and 2) subsequences similar to the ones already added to the dictionary should be avoided, as they provide marginal gains in reducing the overall error. Referring to FIG. 22, Algorithm 1 shows pseudocode of the algorithm, and FIGS. 6-9 can be referred to when describing the functions of the pseudocode. The inputs to the algorithm are a time series $T_B$, a subsequence length m, and a contextual window factor k. The contextual window factor k is a value that adjusts a window of subsequence length m to help capture shifts of a subsequence in a time series. The contextual window factor k can be used to provide additional data points which can precede or follow the selected subsequence to add context to the subsequence.

Figure 6:
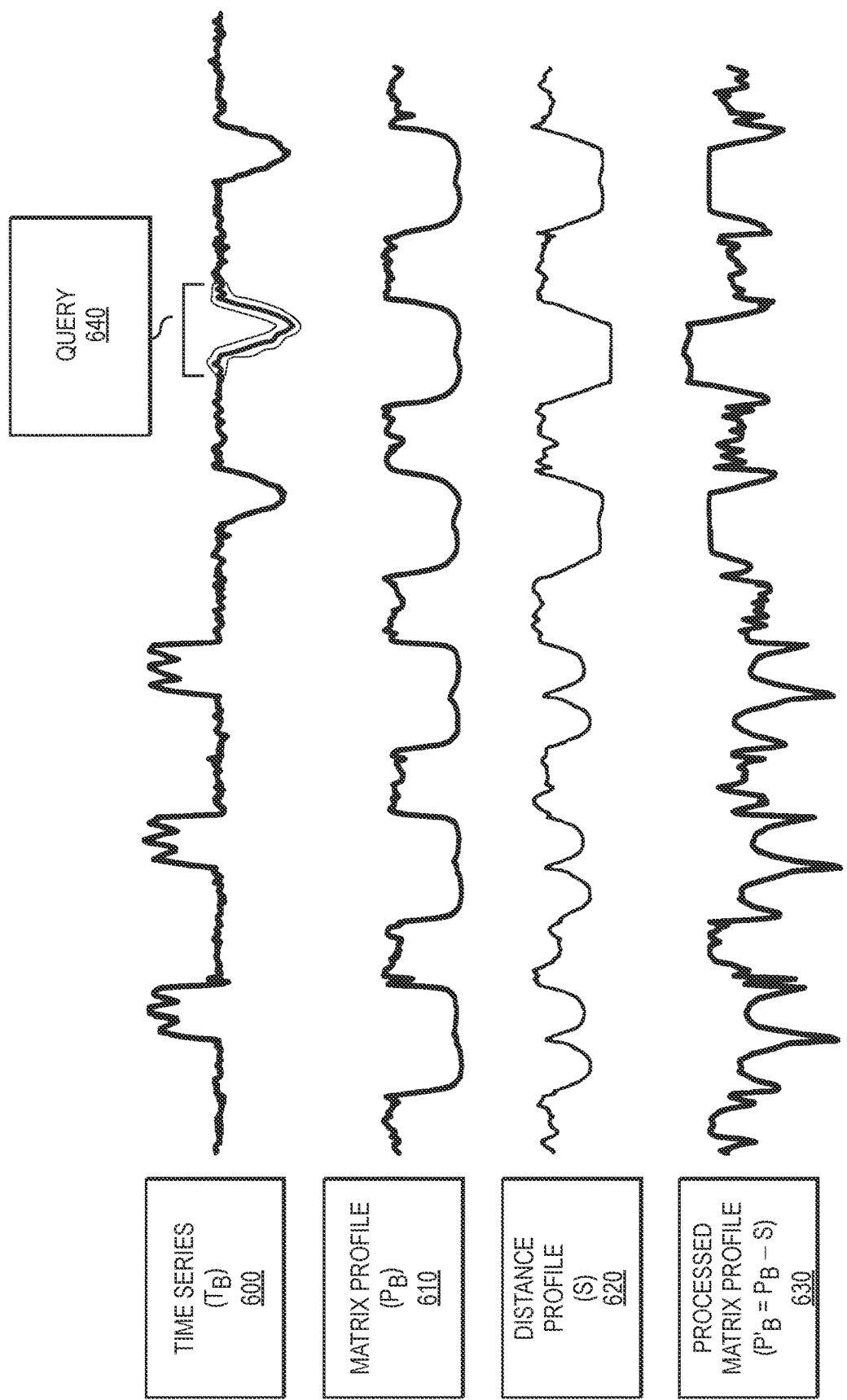
FIG. 6 shows a time series and query with a corresponding matrix profile, distance profile, and processed matrix profile according to embodiments.

FIG. 6 shows a time series 600 ($T_B$ in Algorithm 1) and query 640 with a corresponding matrix profile 610 ($P_B$ in Algorithm 1), distance profile 620 (S in Algorithm 1), and processed matrix profile 630 ($P'_B$ in Algorithm 1) according to embodiments. The time series 600 may be used an input to Algorithm 1, along with a subsequence length m, and a contextual window factor k. The subsequence length m and the contextual window factor k determine the size of the query 640 used for an intra-similarity join. At line 1 of Algorithm 1, three inputs are fed into a dictionary learning function (i.e., "LearnDictionary"). Referring to FIG. 1, for example, time series data can be determined by the server computer 100 after receiving data of time-dependent events. For example, after the server computer 100 receives traffic data from the first client computer 100, the server computer 100 may generate a traffic time series. The server computer 100 may then determine a subsequence length (e.g., based on the shape of the input time series such as the periodicity of the input time series), and a contextual window factor to use as an input to the dictionary learning function. For example, a time series 600 may exhibit sinusoidal behavior with a period of π. The server computer 100 may thus determine a subsequence length m similar to π should be chosen.

At line 2 of Algorithm 1, the size or length n of the input time series 600 may be determined. For example, the time series 600 may be time series data that is in the form of a list. The length of the list (e.g., the amount of elements in the list) can be the length n of the input time series 600. The size n could be the number of data points along a timeline in the time series 600.

At line 3 of Algorithm 1, an intra-similarity join may be used to compute an matrix profile 610 using the time series 600. A subsequence of the time series 600 may be applied to the data in the time series 600 to produce the matrix profile 610. For example, the intra-similarity join may determine a first subsequence of subsequence length m in the time series 600. The intra-similarity join may then apply the determined subsequence to the time series 600 to form a distance profile of the first subsequence and the time series 600 (in a process similar to the above inter-similarity join process as described in FIG. 5). These steps may be repeated for each subsequence in the time series 600, and the initial matrix profile may be formed using the distance profiles of each subsequence. The intra-similarity join outputs the matrix profile 610. The matrix profile 610 can be used as an initial matrix profile that is iteratively processed. One example of the intra-similarity join can be found in Z. Zimmerman, K. Kamgar, N. S. Senobari, B. Crites, G. Funning, P. Brisk, and E. Keogh, "Matrix profile xiv: scaling time series motif discovery with gpus to break a quintillion pairwise comparisons a day and beyond," in Proceedings of the ACM Symposium on Cloud Computing, 2019, pp. 74-86.

In an optional step, at line 4 of Algorithm 1, a temporary variable S to store a distance profile can be initialized. The temporary variable S may be in the form of a zero vector. Similarly, in an optional, at line 5 of Algorithm 1, an empty set $D_B$ may be initialized to store a dictionary.

Lines 6-20 of Algorithm 1 begins an iterative process. At line 7 of Algorithm 1, the matrix profile 610 can be processed further to promote subsequences less similar to subsequences stored in the dictionary $D_B$. In the first iteration of the loop, line 7 has no effect on the matrix profile 610 as the distance profile 620 is initially a zero vector. However, in every other loop, the distance profile 610 stores the inter-similarity join between a subsequence in the dictionary $D_B$ and the time series 600. A first subsequence i and a second subsequence j of the time series 600 may be chosen as candidate subsequences. Both the subsequence i and a second subsequence j may be compared to a subsequence in the dictionary $D_B$. The subsequence that is less similar to the subsequence in the dictionary $D_B$ has a higher value in the distance profile 620 (e.g., S[i]>S[j]). The operation $P_B$–S, which is used to form the processed matrix profile 630, will reduce the matrix profile value associated with the first subsequence i more as compared to the value associated with the second subsequence j. In the nth iteration of the loop, the processed matrix profile is formed by applying the distance profile formed using the nth subsequence to the matrix profile of the previous iteration (e.g., the n−1 matrix profile). Thus, in the first iteration of the loop (n=1), the processed matrix profile 630 ($P'_B=P_B$–S) can be formed by applying the first subsequence 640 to the initial matrix profile 610 ($P_B$ corresponding to n=0), since the first subsequence 640 is used to form the distance profile 620 (S).

Visually, FIG. 6 demonstrates the importance of line 7, where the query 640 is the subsequence added to the dictionary $D_B$ in the previous iteration. If the subsequence associated with the lowest value in the matrix profile 610 is extracted, a different V-shaped pattern to the left or right of the query 640 may be extracted instead of the less similar crown shaped pattern in time series 600. As an example, the distance profile 620 is applied to the matrix profile 610 to form the processed matrix profile 630 (e.g., $P'_B=P_B$–S). The lowest value of the processed matrix profile 630 will lead to the crown-shaped pattern (e.g., the lowest points of the processed matrix profile 630 lines up with the crown-shaped pattern of the time series 600).

Lines 8-11 of Algorithm 1 begin a sub-loop where subsequences similar to subsequences already added to the dictionary are removed from the processed matrix profile 630. Line 8 iterates through all subsequences in the dictionary $D_B$. Line 9 retrieves the starting index (e.g., a timestamp corresponding to the subsequence) of a subsequence in the dictionary $D_B$. Line 10 adds a window to the retrieved index. For the example of the query 640, the retrieved index may be the index corresponding to the center of the V-shape pattern, and the window can select rest of the V-shape pattern the query 640. Line 11 replaces values of the processed matrix profile 630 corresponding to the window with infinity, such that it is guaranteed that the lowest point of the processed matrix profile 630 is not similar to any subsequence in the dictionary $D_B$. Trivial matches to the retrieved subsequence may also be replaced with infinity. Methods to find trivial matches of the retrieved subsequence can be found in C.-C. M. Yeh, Y. Zhu, L. Ulanova, N. Begum, Y. Ding, H. A. Dau, D. F. Silva, A. Mueen, and E. Keogh, "Matrix profile i: all pairs similarity joins for time series: a unifying view that includes motifs, discords and shapelets," in 2016 IEEE 16th International Conference on Data Mining (ICDM), Ieee, 2016, pp. 1317-1322.

At line 12 of Algorithm 1, a novel subsequence in the time series 600 may be determined from the processed matrix profile 630. An index j associated with the best candidate for adding a new subsequence to the dictionary $D_B$ can be determined by determining the minimum value of the processed matrix profile 630. As the subsequences similar to subsequences already in the dictionary $D_B$ are removed in lines 8-11, the minimum value in the processed matrix profile 630 corresponds to the time series motif in the time series 600 that has not been added to the dictionary $D_B$. For example, in a second iteration, the minimum value of the processed matrix profile 630 corresponds to an index that may be used to determine a second subsequence (e.g., the crown-shaped pattern) from the time series 600 that is different from the query 640.

Figure 9:
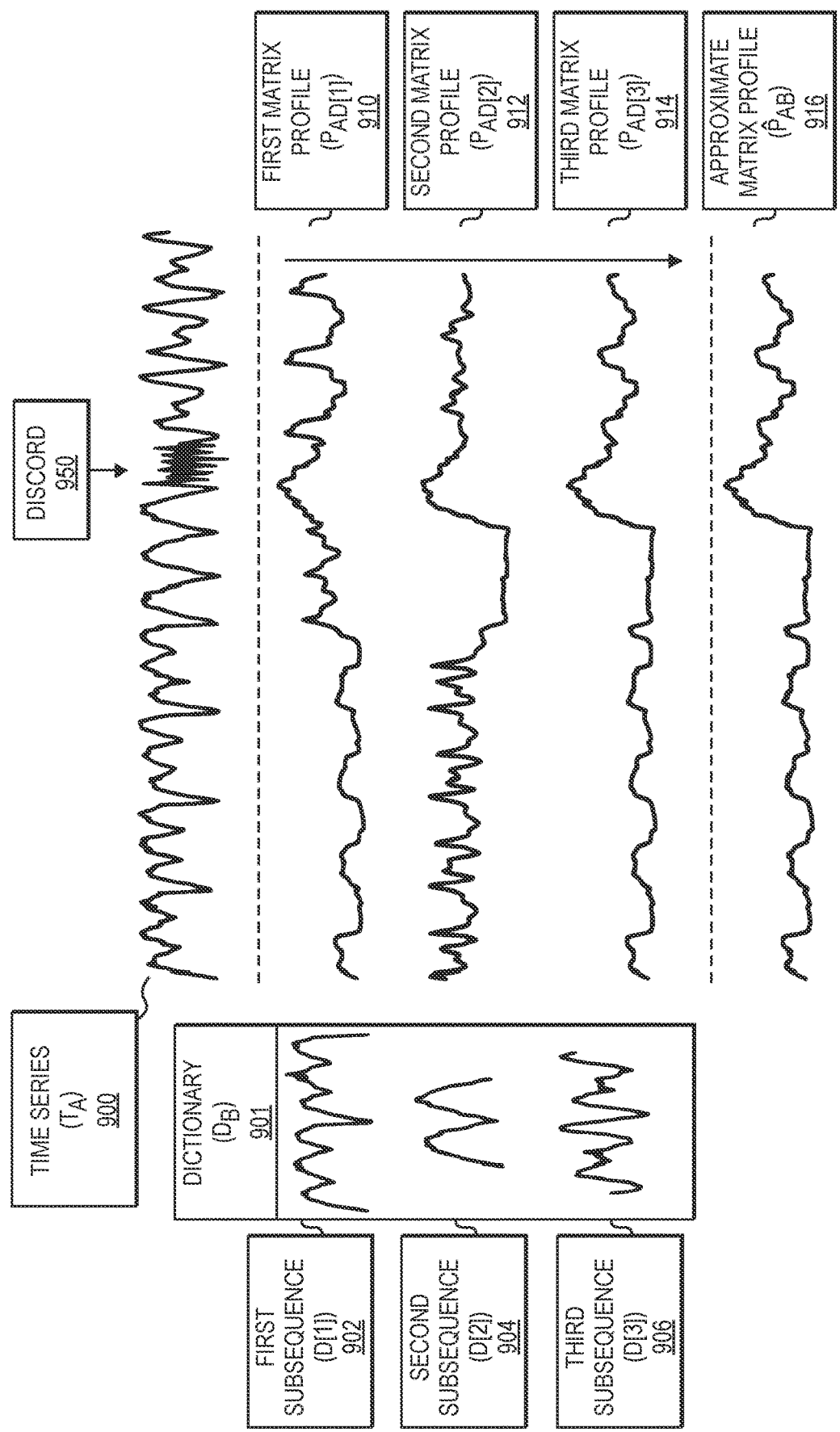
FIG. 9 shows an approximate matrix profile of a time series generated by combining the matrix profile between the time series and all elements of a dictionary according to embodiments.

At line 13 of Algorithm 1, a second subsequence $$T_B[j - \frac{m(k-1)}{2} : j + \frac{m(k+1)}{2}]$$

in the time series 600 may be determined. The second subsequence $$T_B[j - \frac{m(k-1)}{2} : j + \frac{m(k+1)}{2}]$$

associated with the determined index j may then be added to the dictionary $D_B$. As the subsequences similar to subsequences already in the dictionary $D_B$ are removed in lines 8-11, the second subsequences are added to the dictionary $D_B$ if the second subsequence, or a substantially similar subsequence is not stored in the dictionary $D_B$. Visually, the subsequences may appear substantially similar to each other when they are superimposed on each other, such as in the case where subsequence 902 in FIG. 9 is superimposed on the beginning portions of the time series 900 in FIG. 9. In specific examples, subsequences may be considered to be substantially similar if greater than 75, 85, or 90 percent of the values at corresponding times in the sequence are within ten, 5, or 2 percent of each other. Note that embodiments of the invention are not limited to these values.

Figure 7:
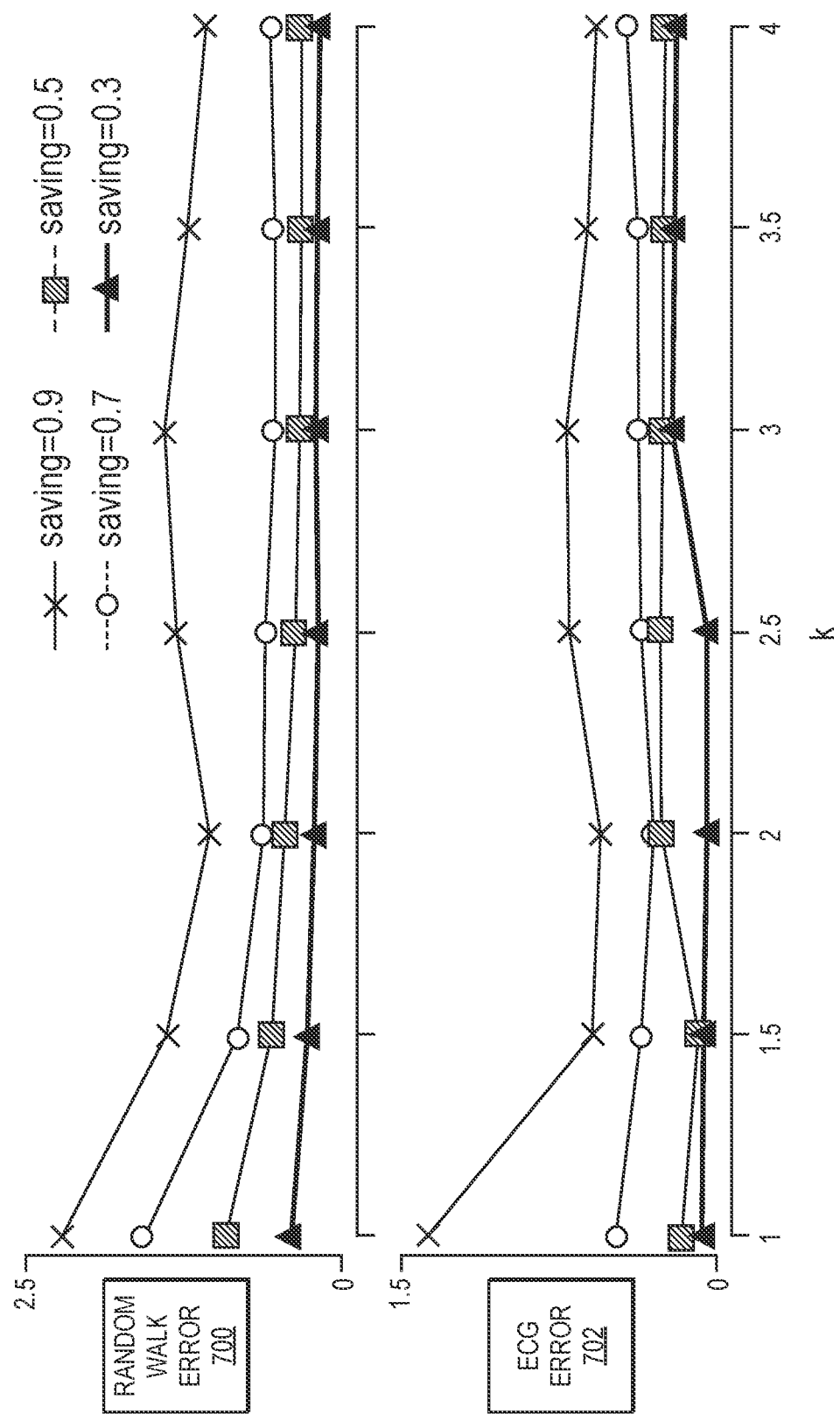
FIG. 7 shows error values in dictionary elements associated with various values of a contextual window factor according to embodiments.

The contextual window factor k adds additional points to the preceding and following the initially identified subsequence. A larger contextual window helps to capture a different shift of a pattern when the input time series is highly periodic. The size of the contextual window is parameterized by the hyper-parameter contextual window factor k that is given as input to Algorithm 1. FIG. 7 shows the impact of the impact of different contextual windows on the approximation.

FIG. 7 shows error values in dictionary elements associated with various values of a contextual window factor according to embodiments. The space saving factor $$(e.g., 1 - \frac{\text{compressed size}}{\text{uncompressed size}})$$

of a random walk error time series and an electrocardiogram time series is tested. The quality of the dictionary constructed using Algorithm 1 is measured by computing the average Euclidean distance between the true matrix profile and the approximate matrix profile. Shown by FIG. 7, in a random walk error 700 graph and an ECG error 702 graph shows that setting the contextual window factor k in the range of [1.5, 2] gives the most accurate approximate matrix profiles, and the proposed matrix is not sensitive to k if k is in [1.5, 4]. For subsequent calculations, k is fixed to 1.5.

Figure 8:
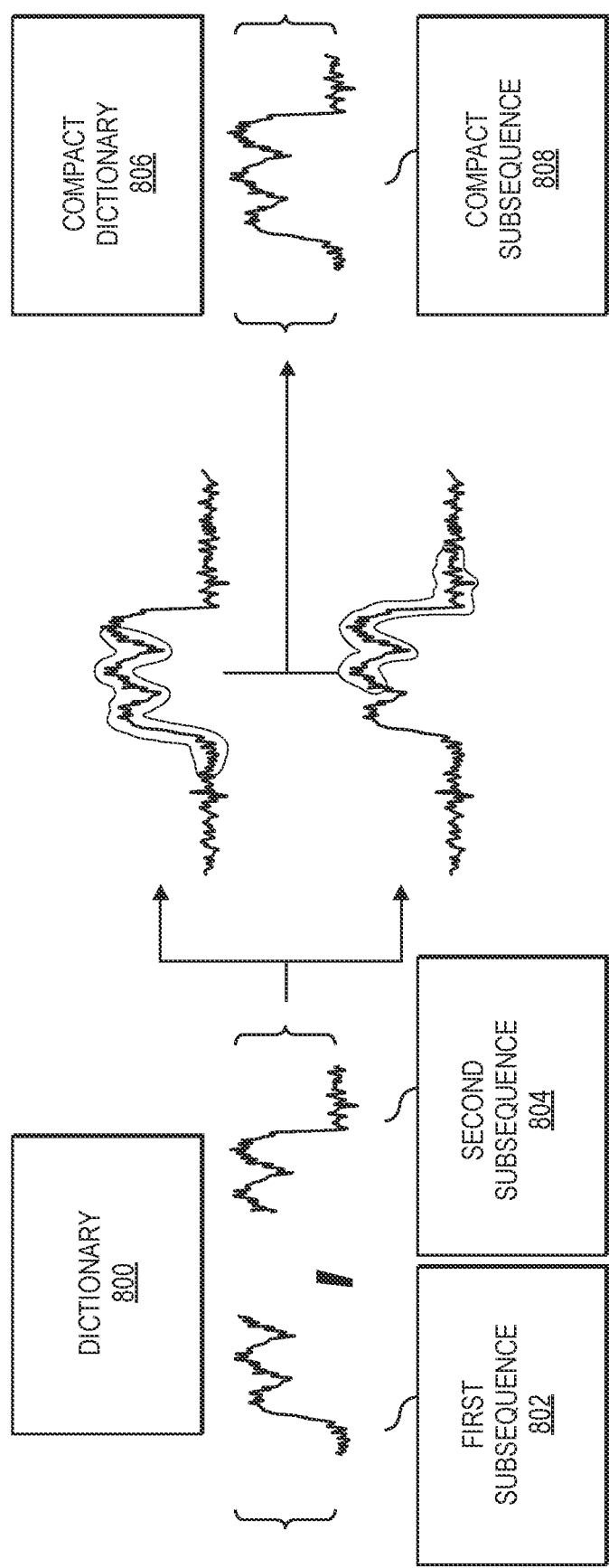
FIG. 8 shows a method to combine elements of a dictionary according to embodiments.

In some embodiments as an additional step to Line 13, to compactly store subsequences in the dictionary $D_B$, overlapping subsequences can be merged as shown by FIG. 8.

FIG. 8 shows a method to combine subsequences of a dictionary 800 according to embodiments. A first subsequence 802 in the dictionary 800 can be compared with a second subsequence 804 in the dictionary 800. As a result of the comparison (e.g., determining the first subsequence 802 and the second subsequence 804 overlap), a compact subsequence 808 that combines both the first subsequence 802 and the second subsequence 804 may be stored in the dictionary 800. In doing so, a compact dictionary 806 does not store the overlapping region of the first subsequence 802 and the second subsequence 804 to compactly store the compact subsequence 808. A similar process may occur for each new subsequence to be added in the dictionary 800. Each new subsequence may compare the new subsequence to other subsequences in the dictionary 800, and if any of the subsequences overlap, the new subsequence may be combined with the overlapping subsequence in the dictionary 800.

At lines 14 and 15 of Algorithm 1, a terminal condition may be checked. Algorithm 1 may exit the loop and returns the dictionary $D_B$ if the terminal condition is met. Two examples of a terminal condition are as follows: 1) terminate based on memory usage and 2) terminate based on max error $e_{max}$. A users may design the terminal condition based on their specific application. For example, if the application requires performing similarity join on a machine with limited memory, then the user may terminate the dictionary learning algorithm with condition 1. If the quality of the approximate solution is more critical for the application, the user may instead choose to terminate based condition 2.

At line 16 of Algorithm 1, a modified distance profile S' may be computed by querying the time series 600 with the subsequence added in the current iteration.

Lines 17-20 of Algorithm 1 may merge the modified distance profile S' with the distance profile of the previous iteration. Line 17 of Algorithm 1 may check if the current iteration is the first iteration by checking if the distance profile is a zero vector. If the distance profile is determined to be the zero vector, at line 18, the modified distance profile S' may be set as the distance profile S. Line 20 merges the modified distance profile S' with the distance profile S of the previous iteration using an element-wise minimum between the two distance profiles. The resultant merged distance profile S measures the distance between each subsequence with each element in the dictionary $D_B$, and is used in the next iteration in line 7 to process the matrix profile $P_B$. In each iteration, a subsequence can be applied to the time series to form a distance profile S (e.g., at each iteration, the subsequence is inter-similarity joined with the input time series).

After the terminal condition is met, the dictionary $D_B$ is returned. For at least one particular implementation, the time complexity is $O(\max(n^2, n_{iter} n \log n))$, where n is the length of the input time series and $n_{iter}$ is number of iterations, which depends on the terminal condition. The $n^2$ term is from the intra-similarity join operation in line 3 of Algorithm 1, and the $n_{iter} n \log n$ term is from calling a MASS algorithm $n_{iter}$ times in line 16 used to compute a modified distance profile S'. Note, because the algorithm avoids selecting trivial matches of any previously added dictionary element using a subsequence length m in line 11, the maximum possible iterations $n_{iter}$ is $\frac{n}{m}$. Because the subsequence length m is usually greater than $\log n$, this makes $n_{iter} n \log n$ less than $n^2$, and the overall time complexity becomes $O(n^2)$. The time complexity can be further reduced if the join operation in line 3 is replaced with an approximate intra-similarity join algorithm.

Once the dictionary $D_B$ is learned from the time series 600, a similarity join algorithm described by Algorithm 2 shown in FIG. 23 may be used to compute an approximate inter-similarity join matrix profile $\hat{P}_{AB}$ for any given time series $T_A$. The inputs to the Algorithm 2 are a time series $T_A$, a dictionary $D_B$, and subsequence length m. The process of Algorithm 2 may be visually explained by FIG. 9.

FIG. 9 shows an approximate matrix profile 916 ($\hat{P}_{AB}$ in Algorithm 2) of a time series 900 ($T_A$ in Algorithm 2) generated by combining the matrix profiles (e.g., 910, 912, 914) of all subsequences (e.g., 902, 904, 906) of a dictionary 901 according to embodiments. The subsequences 902, 904, 906, may be present in the dictionary 901.

At line 1 of Algorithm 2, the algorithm may take the time series 900 ($T_A$ in Algorithm 2), a dictionary 901 ($D_B$ in Algorithm 2), and a subsequence length m as input.

At line 2 of Algorithm 2, the time series length n may be determined from the time series 900.

In an optional step, at line 3 of Algorithm 2, an empty array used to store the approximate matrix profile 916 as a infinity vector of length n−m+1.

Lines 4-6 begin an iterative process through which the subsequences of the dictionary 901 ($D_B$) can used to form the approximate matrix profile 916. The dictionary 901 ($D_B$) comprises a first subsequence 902 (D[1]), a second subsequence 904 (D[2]), and a third subsequence 906 (D[3]). Although FIG. 9 shows three subsequences in the dictionary 901 ($D_B$), more or less subsequences may be included in the dictionary 901 ($D_B$). Lines 4-6 may process all subsequences in the dictionary 901 ($D_B$), which correspond to all subsequences in the time series. By parsing through each subsequence in the dictionary 901 ($D_B$), lines 4-6 are repeated until all subsequences in the time series are processed.

At line 5 of Algorithm 2, an inter-similarity join matrix profile between the time series 900 and the dictionary 901 is computed and stored. For example, a first subsequence 902 may be inter-similarity joined with the time series 900 to compute a first matrix profile 910. Similarly, the second subsequence 904 and the third subsequence 906 may be inter-similarity joined with the time series 900 to compute a second matrix profile 912 and a third matrix profile 914. In this manner, a plurality of subsequence matrix profiles may be generated by applying the plurality of subsequences in the dictionary to the time series 900.

At line 6 of Algorithm 2, the first matrix profile 910 may be combined with the second matrix profile 912 using an element-wise minimum function. For example, the element-wise minimum function may compare values of the first matrix profile 910 to the the approximate matrix profile 916 (which is initially infinity). The element-wise minimum of between the two matrix profiles may be set to the value at the corresponding index of the approximate matrix profile 916. Additionally, the second matrix profile 912 and the third matrix profile 914 may be combined with the approximate matrix profile 916 using the element-wise minimum function. The resultant approximate matrix profile 916 is returned in line 7 of Algorithm 2. The approximate matrix profile 916 is formed using the plurality of subsequence matrix profiles.

In this example of FIG. 9, the input time series 900 consists of three repeated patterns and one unique pattern (or anomaly); the input dictionary $D_B$ contains three subsequences (e.g., the dictionary may be filled with these elements via Algorithm 1), where each subsequence corresponds to one of the three repeated patterns in the time series 900. Each subsequence in the dictionary 901 consists of only one of the three repeated patterns, each inter-similarity join matrix profile for each iteration (i.e., the first matrix profile 910) has low values associated with the corresponding repeated pattern. By combining the resultant first matrix profile 910, the second matrix profile 912, and the third matrix profile 914 with an element-wise minimum function, the formed approximate matrix profile 916 reveals the anomaly 950. The maximum value of the approximate matrix profile 916 can be used to determine the anomaly 950 in the time series 900. For example, the maximum value of the approximate matrix profile 916 lines up with the unique pattern of the time series 900. By first determining a maximum value of the approximate matrix profile 916, the index of the maximum value may be retrieved. The index can then be used to access the time series 900 to find the anomaly 950 in the time series 900. In some embodiments, the top values of portion of the approximate matrix profile 916 may be used to determine one or more anomalies in the time series 900. For example, the approximate matrix profile 916 may have several peaks, and and the top value from each portion of the approximate matrix profile 916 may be used to determine one or more anomalies in the time series 900.

The time complexity for this implementation of Algorithm 2 is $O(|D_B|n)$ where $|D_B|$ is the number of data points in $D_B$ and n is the length of $T_A$. Because the time complexity for line 5 is $0(|D_B|n)$ and $\Sigma_{D_B \in D_B}|D_B|=|D_B|$, the total time complexity is $\Sigma_{D_B \in D_B} 0(|D_B|n)=0(|D_B|n)$.

To confirm that different time series have different levels of "compressibility" as demonstrated in FIGS. 2 and 3, dictionaries learned using Algorithm 1 using an extend version of the three time series shown in FIG. 1 under various space saving factors. The max error $e_{max}$ associated with each dictionary is measured and summarized in FIG. 10.

Figure 10:
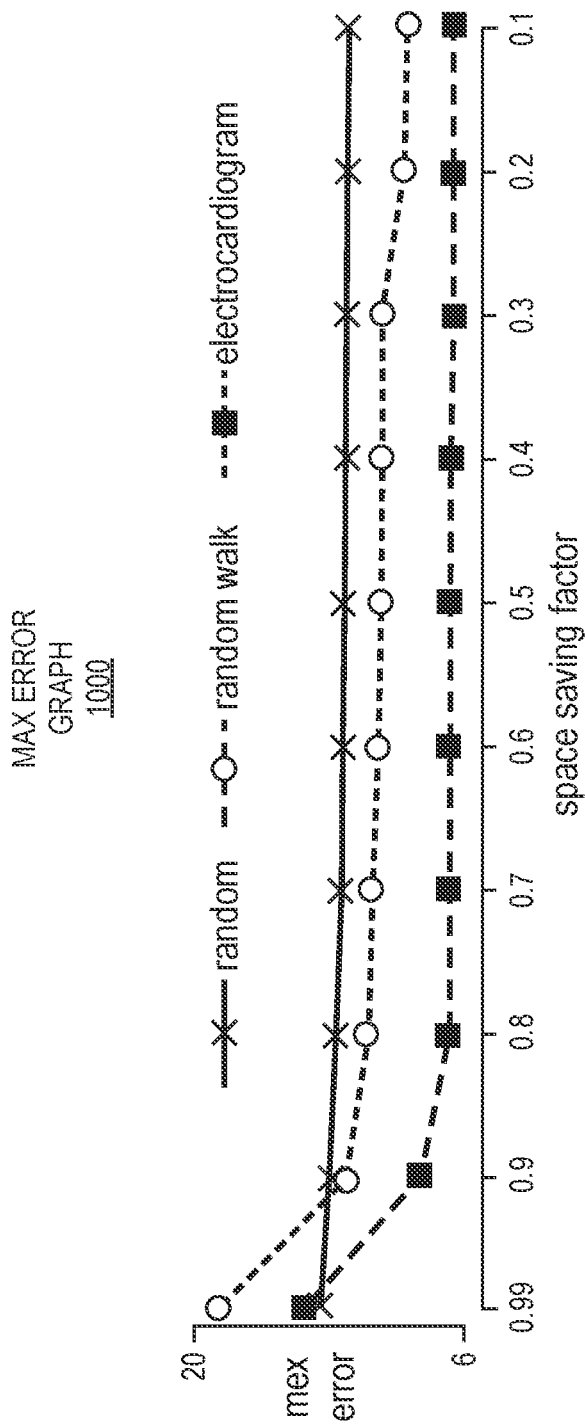
FIG. 10 shows a graph illustrating maximum error values vs. space saving factors for a plurality of time series according to embodiments.

FIG. 10 shows a graph 1000 illustrating maximum error values vs. space saving factors for a plurality of time series according to embodiments. The maximum error graph 1000 shows the max error $e_{max}$ is reduced as the space saving factor is reduced. Such a correlation is expected, as a larger dictionary captures more information and therefore, the max error is expected to be lower. Secondly, the max error $e_{max}$ is nearly unchanged for random time series. This is also expected behavior, as random time series do not contain any visually distinguishable patterns. Subsequences in a random time series are not correlated with each other (e.g., the Pearson correlation coefficient between subsequences is always close to zero). Third, the $e_{max}$ associated with the both random walk time series and the ECG time series decreases as the dictionary size is increased. The change is drastic for lower space saving factors then the error stops improving when the space saving factor is greater than 0.8. The ECG dictionary has the lowest $e_{max}$ when the space saving is smaller or equal to 0.9.

To empirically validate the derived theoretical max error $e_{max}$, dictionaries learned from the ECG time series are joined under various space saving factors with another, much longer, ECG time series. The length of the longer ECG time series is around 10 million, and the length of the shorter time series is around 8,000. Using the notation we presented above, a dictionary $D_B$ is learned from the 8,000 length time series $T_B$, and the dictionary $D_B$ is joined with the 10 million length time series $T_A$. The approximated matrix profile $\hat{P}_{AB}$ is compared with the exact matrix profile $P_{AB}$ and the empirical error vector E is computed as the difference between the two matrix profiles (e.g., $\hat{P}_{AB}$-$P_{AB}$). The error vector E is summarized using the mean, standard deviation, maximum, and minimum as shown in FIG. 11.

Figure 11:
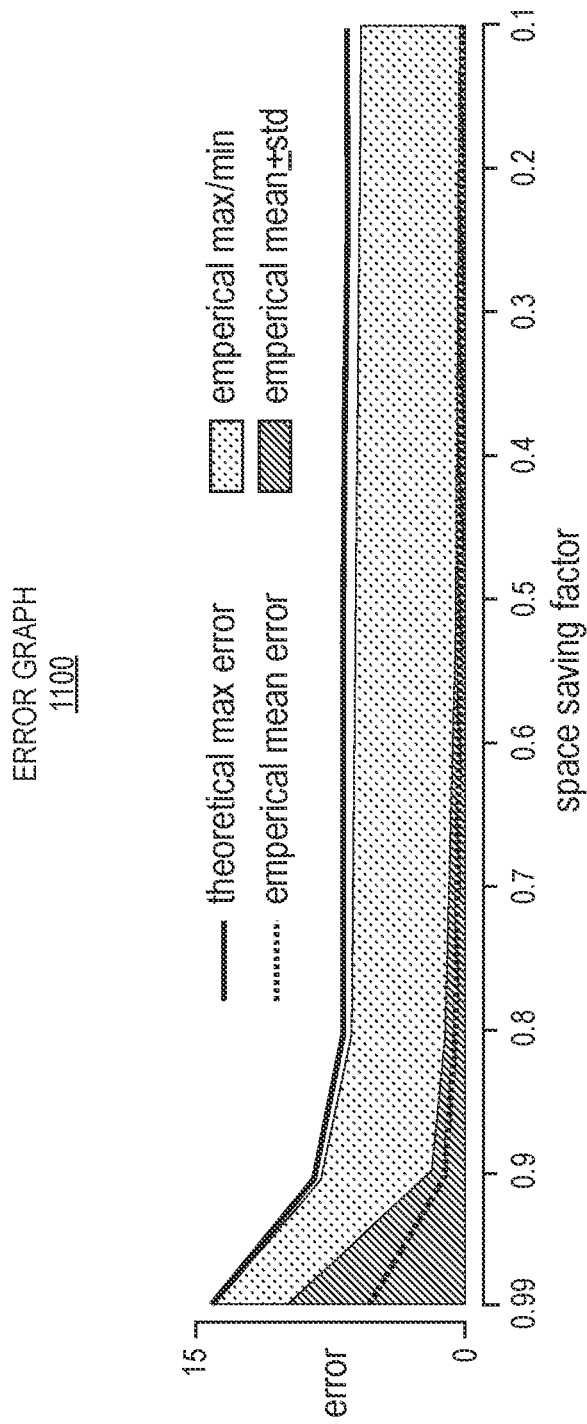
FIG. 11 shows a graph of theoretical error values as compared to empirical error values vs. space saving factors for various values of a contextual window factor according to embodiments.

FIG. 11 shows a graphs of theoretical error values as compared to empirical error values vs. space saving factors for various values of a contextual window factor according to embodiments. An important observation from the error graph 1100 of FIG. 11 is that the empirical maximum error never exceeds the theoretical error $e_{max}$. In other words, an empirical validatation that the theoretical error $e_{max}$ is error bound is given. Next, the standard deviation is reduced more compared to the mean and the maximum error at lower space saving factors and the minimum error is almost always close to zero. This shows for compressible data such as ECG, an accurate approximation using only a fraction of the original data can be created.

To evaluate whether Algorithm 1 is capable of creating quality dictionaries, Algorithm 1 is compared with a random baseline (e.g., randomly selecting a subsequence from a time series and adding the selected subsequence to a dictionary at each iteration) using the 2017 Melbourne Pedestrian Dataset found in City of Melbourne, "Pedestrian counting system—monthly (counts per hour)," https://data.melbourne.vic.gov.au/Transport/Pedestrian-Counting-System-Monthly-counts-per-hour/b2ak-trbp. Processing applied to the original dataset to format the original dataset into the UCR Archive format with 10 different classes as shown in UCR Archive H. A. Dau, E. Keogh, K. Kamgar, C.-C. M. Yeh, Y. Zhu, S. Gharghabi, C. A. Ratanamahatana, Yanping, B. Hu, N. Begum, A. Bagnall, A. Mueen, G. Batista, and Hexagon-ML, "The ucr time series classification archive," October 2018, https://www.cs.ucr.edu/eamonn/time_series_data_2018/.

Figure 12:
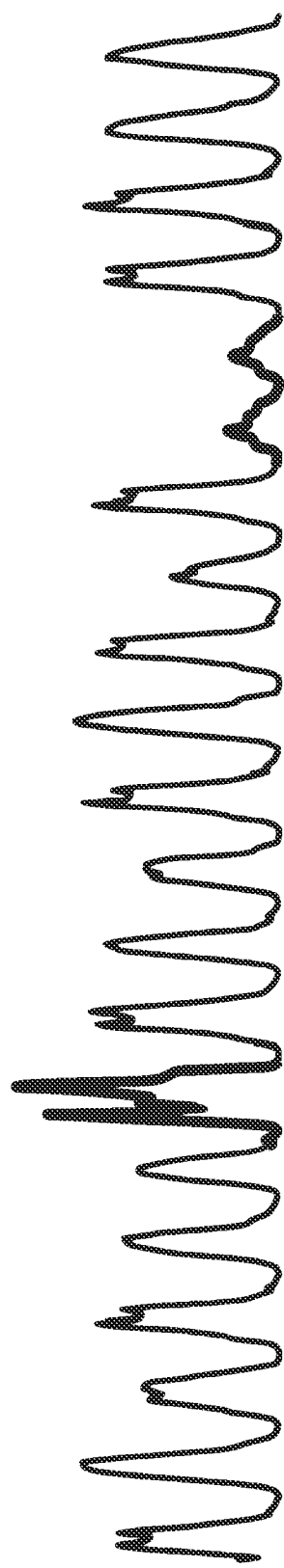
FIG. 12 shows a sample time series extracted from the Melbourne Pedestrian Dataset.

FIG. 12 shows a sample time series 1200 extracted from the Melbourne Pedestrian Dataset. In each trial, a random class is selected as the background class, and other classes are treated as the foreground class (bold in FIG. 12). All time series from the background class are concatenated to form the background time series. For each foreground classes, a few time series are randomly selected (2 to 16, based on random number generator) and the selected time series are inserted into the background time series.

As both Algorithm 1 and the random baseline grow the dictionary incrementally, both methods are ran until the dictionary captures time series from all 10 classes and record the associated space saving factor. The recorded space saving factors are used as a measure of the quality of a dictionary. A thousand trials are performed, and the result is summarized in a histogram as shown in FIG. 13.

Figure 13:
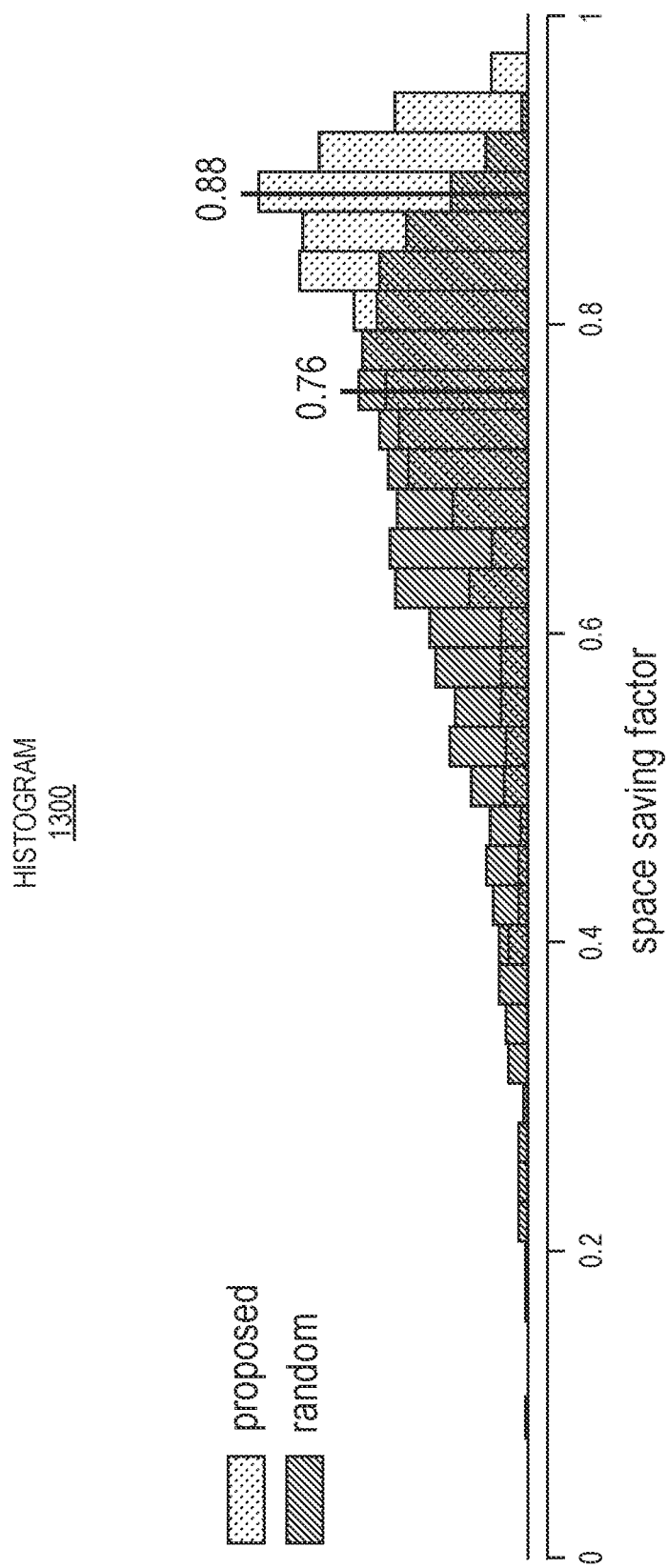
FIG. 13 shows histogram of space saving factors generated by a random baseline and an approximate join algorithm according to embodiments.

FIG. 13 shows histogram of space saving factors generated by a random baseline and an approximate join algorithm according to embodiments. The histogram 1300 shows the approximate inter-similarity join generally has a higher space saving factors compared to the random baseline. The most populated bins for the approximate inter-similarity join and the random baseline are 0.88 and 0.76, respectively. Additionally, the approximate inter-similarity join performs more consistently, as it has a more concentrated distribution compared to the random baseline.

The runtime of the dictionary building algorithm (Algorithm 1) and the dictionary join algorithm (Algorithm 2) are tested. For all the experiments presented in the following, the number of processor threads is set to 4, the algorithms are tested using on the same 8,000 length ECG time series shown in FIG. 1, and the runtime is measured on a computer with a 2.9 GHZ Quad-Core Intel Core i7 processor.

Figure 14:
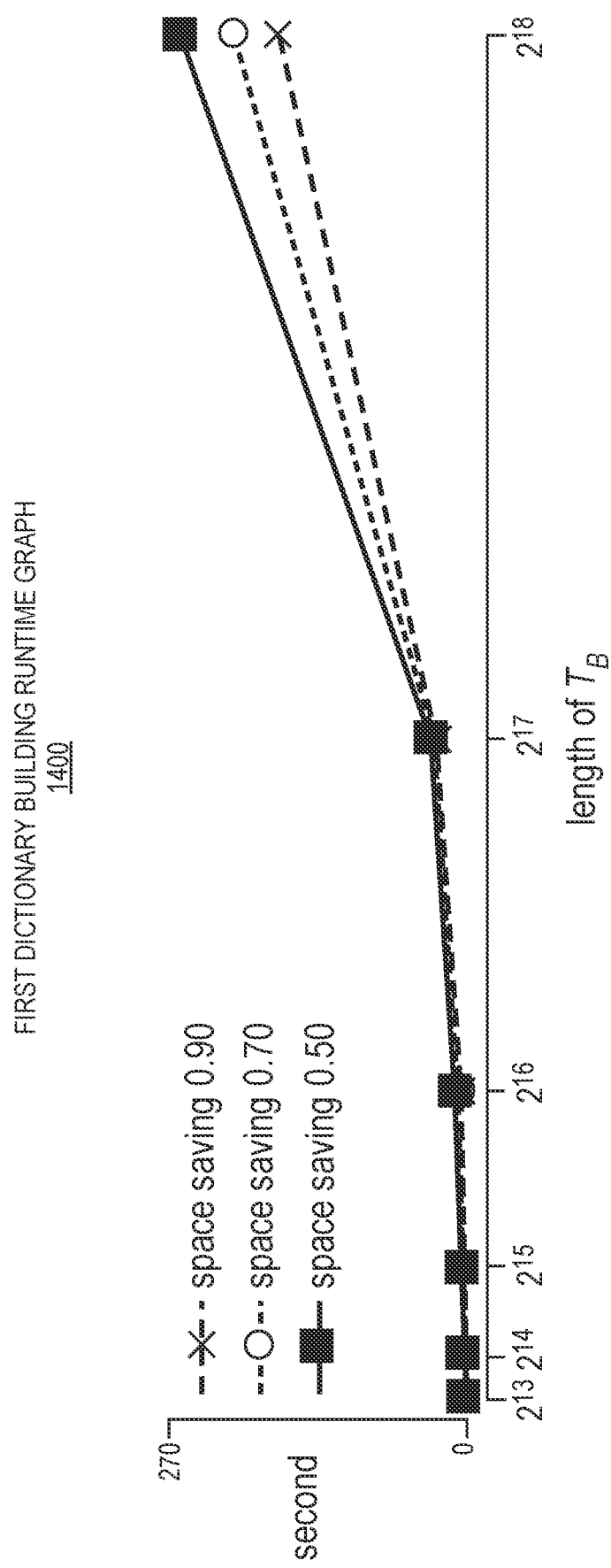
FIG. 14 shows a first dictionary building runtime graph of runtime vs. time series lengths for various space saving factors according to embodiments.

FIG. 14 shows a first dictionary building runtime graph of runtime vs. time series lengths for various space saving factors according to Based on the time complexity analysis above, the runtime of Algorithm 1 is based on the length of input time series (i.e., n) and the number of iterations performed (i.e., $n_{iter}$). The length of input time series is easily modified by using the first n points as the input time series. To vary the iterations $n_{iter}$, a different terminal condition is used based on space saving factor. The subsequence length m and contextual window factor k are fixed to 100 and 1.5, respectively. The result runtime is presented the first dictionary building runtime graph 1400. The runtime grows quadratically with the length of time series $T_B$, which agrees with the runtime analysis. The runtime also reduces as the space saving factor increases, as less iterations are required to construct a smaller dictionary. To examine the relationship between dictionary building time and space saving factor closely, the length of the time series $T_B$ is set to $2^{18}$ the runtime is measured for several space saving factors. The result is presented in FIG. 15.

Figure 15:
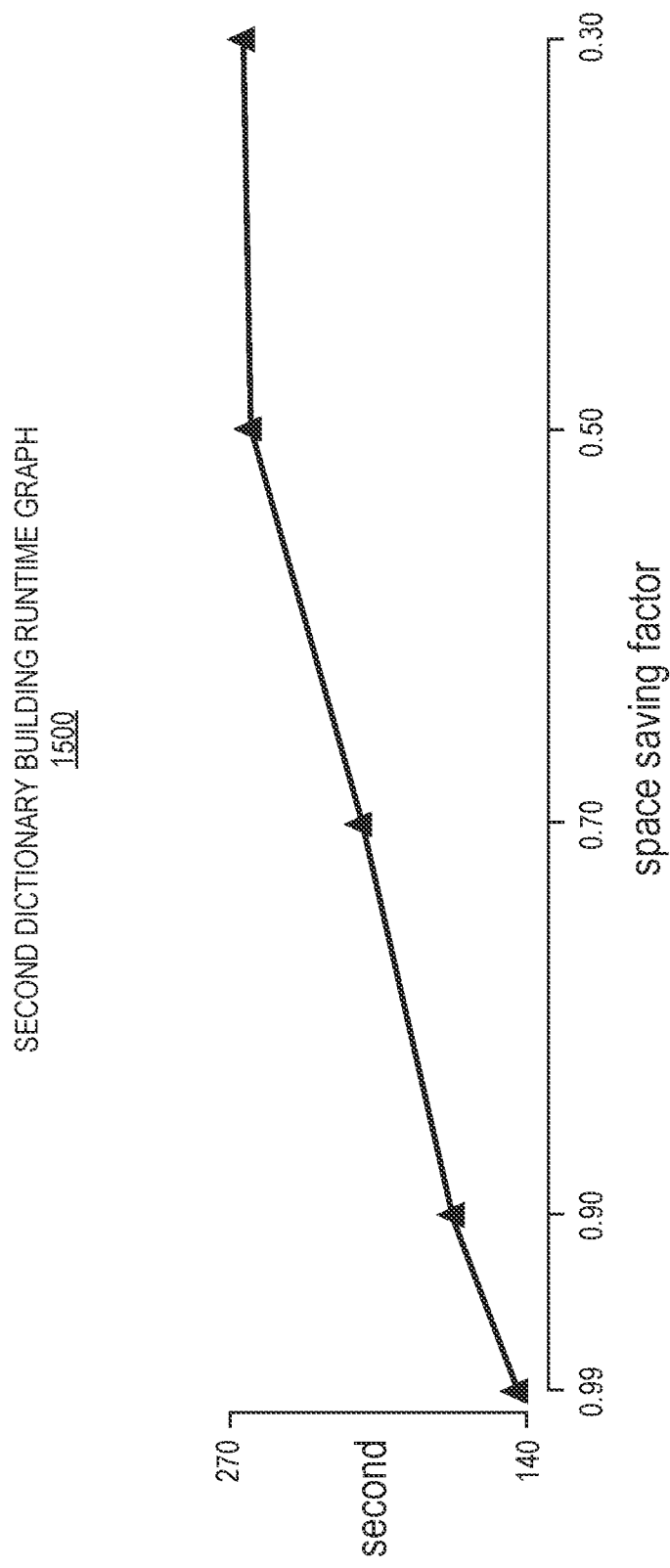
FIG. 15 shows a second dictionary building runtime graph of runtime vs. space saving factor according to embodiments.

FIG. 15 shows a second dictionary building runtime graph of runtime vs. space saving factor according to embodiments The runtime for building dictionaries generally increases as the desired dictionary size is larger (e.g., a lower space saving factor is wanted). From the second dictionary building runtime graph 1500, it can be seen that that for higher space saving factors, the reduction on runtime is much more noticeable compared to lower space saving factors as the runtime difference of space saving factors below 0.5 is much larger compared to the runtime difference of space saving factors above 0.5.

Figure 16:
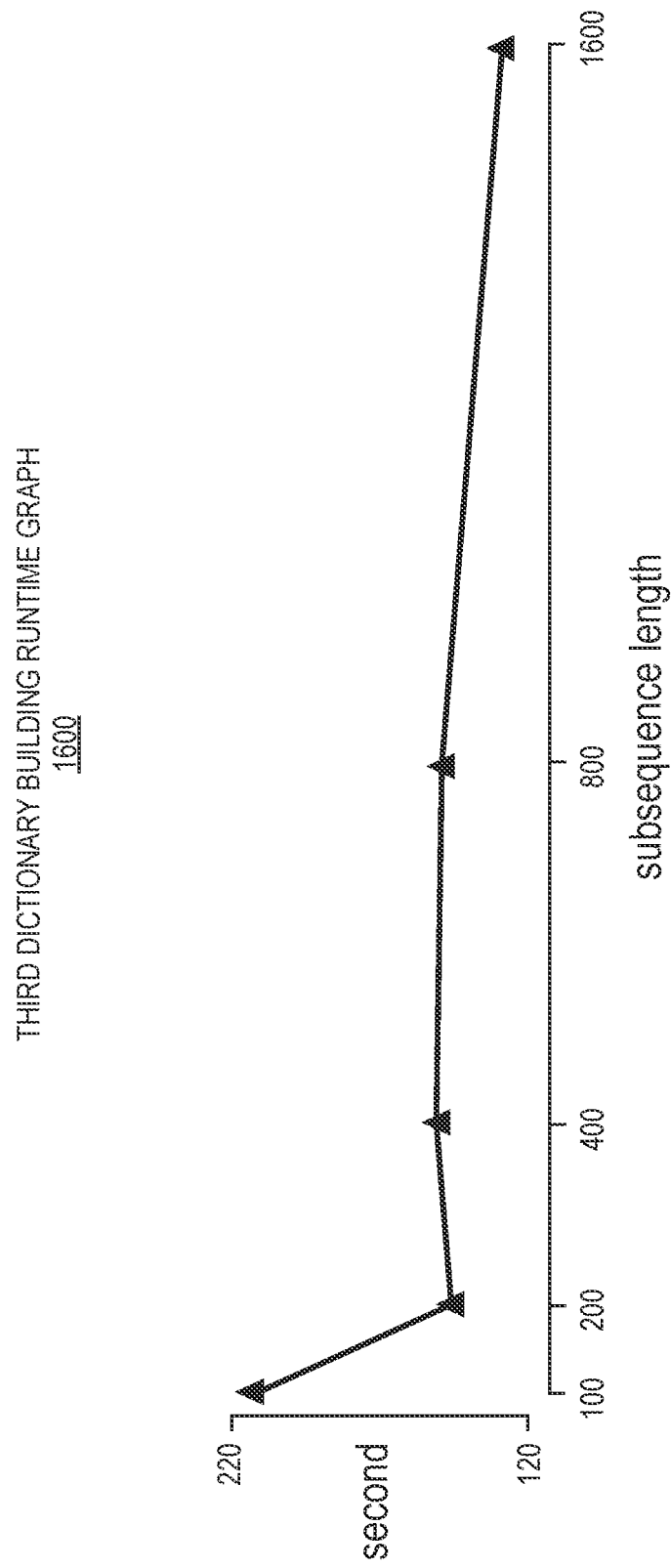
FIG. 16 shows a third dictionary building runtime graph of runtime vs. subsequence length according to embodiments.

FIG. 16 shows a third dictionary building runtime graph of runtime vs. subsequence length according to embodiments. The effect of subsequence lengths on runtime is evaluated. The length of the time series $T_B$ is set to $2^{18}$ and the space saving factor is set to 0.5. As shown by the third dicitonary runetime graph 1600, the dictionary building runtime reduces as the subsequence length increases. Such phenomena occurs due to increasing subsequence length reducing the number of subsequences in the time series $T_B$.

Similar to the dictionary building algorithm of Algorithm 1, the length of time series noticably impacts the runtime of the dictionary join algorithm of Algorithm 2. However, for the dictionary join algorithm, there are two time series: the time series where the learned dictionary $D_B$ is built from (e.g., $T_B$) and the time series which $D_B$ is joined with (e.g., $T_A$). Another factor which affects the runtime is the size of dictionary (e.g., $|D_B|$). To control the time series lengths, one time series is fixed at a size of $2^{17}$ while the length of the other time series is varied. To vary the size of dictionary, the space saving factor terminal condition is again used. FIG. 17 summarizes the runtime results.

FIG. 17 shows first and second dictionary join runtime graphs of runtime vs. time series length for various spacing factors according to embodiments. FIG. 17 shows a first dictionary join runtime graph 1700 and a second dictionary join runtime graph 1702 both for various space saving factors and time series lengths according to embodiments. In both the first dictionary join runtime graph 1700 and the second dictionary join runtime graph 1702, the runtime of an exact inter-similarity join algorithm is included to demonstrate the runtime benefits that are provided by the approximate inter-similarity join. The reduction of runtime using the approximate inter-similarity join algorithm can be seen in the two runtime graphs. By setting the space saving factor to 0.5, the runtime is reduced to roughly 50% of the exact join in both the first dictionary join runtime graph 1700 and the second dictionary join runtime graph 1702. The time complexity for Algorithm 2 is $O(|D_B|n)$. Changing the length of the dictionary building time series $T_B$ varies $|D_B|$ as fixed the space saving factor for each line and changing the length of join time series $T_A$ varies the time series length n. Both the length of the dictionary building time series $T_B$ and length of the join time series $T_A$ has a linear relationship with the runtime based on the runtime analysis, and the discovered relationship agrees with the experimental result.

Figure 18:
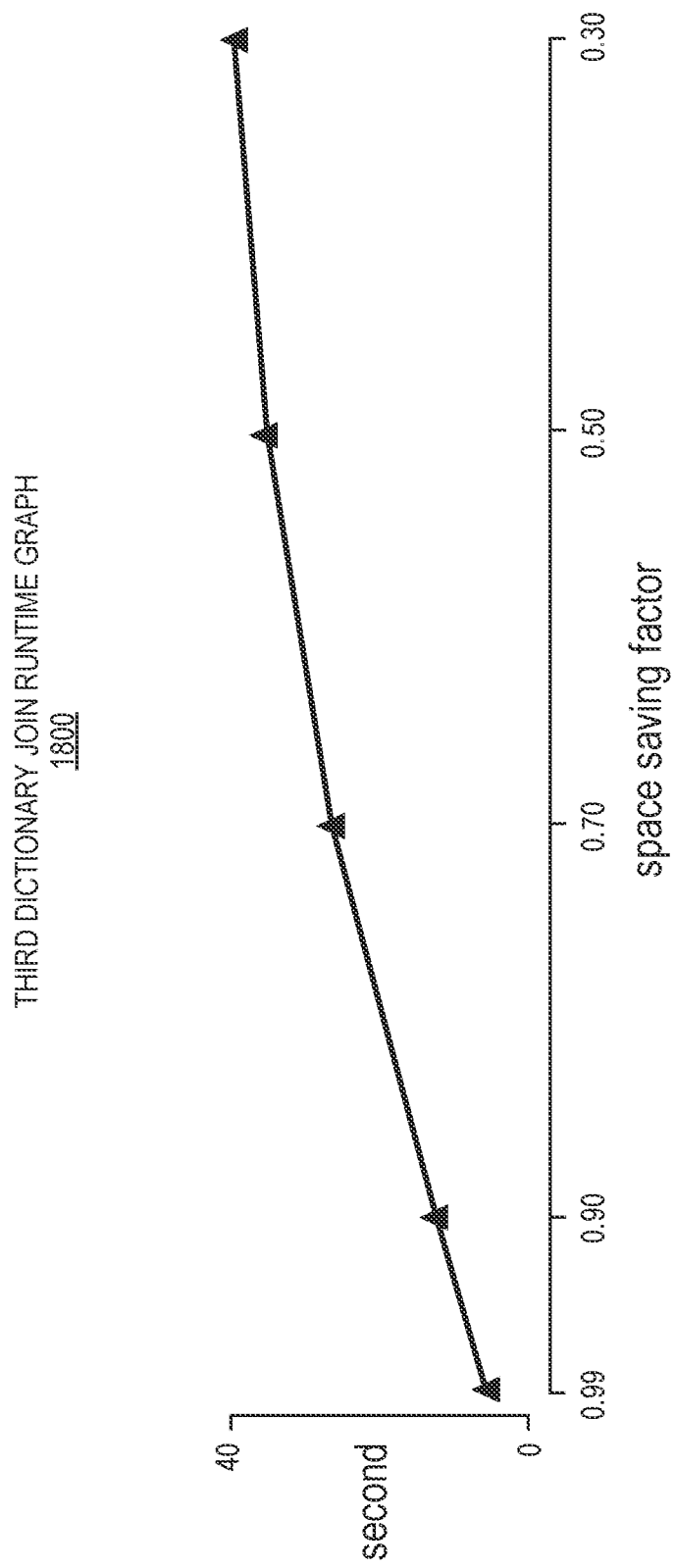
FIG. 18 shows a third dictionary join runtime graph of runtime vs. space saving factor according to embodiments.

FIG. 18 shows a third dictionary join runtime graph of runtime vs. space saving factor according to embodiments. The relationship between the space saving factor and runtime is examined further. The length of the dictionary building time series $T_B$ and the join time series $T_A$ is set to $2^{17}$, and the runtime is measured for various space saving factors. The overall trend is very similar to the second dictionary building runtime graph 1500 of FIG. 15. The key difference between the third dictionary join runtime graph 1800 and the second dictionary building runtime graph 1500 is the time difference in terms of percentage. The runtime percentage reduction by increasing the space saving factor from 0.3 to 0.99 is 87% for third dictionary join runtime graph 1800 while the percentage is 51% for second dictionary building runtime graph 1500. This difference exists because the join operation in line 3 of Algorithm 1 does not depend on the setting of space saving factor, but the loop from lines 6-20 of Algorithm 1 does depend on the setting of space saving factor. In other words, Algorithm 1 requires to pay a "fixed" computational cost regardless of the reduction in dictionary size. In contrast, the entirety of Algorithm 2 benefits from smaller dictionaries in terms of runtime.

Figure 19:
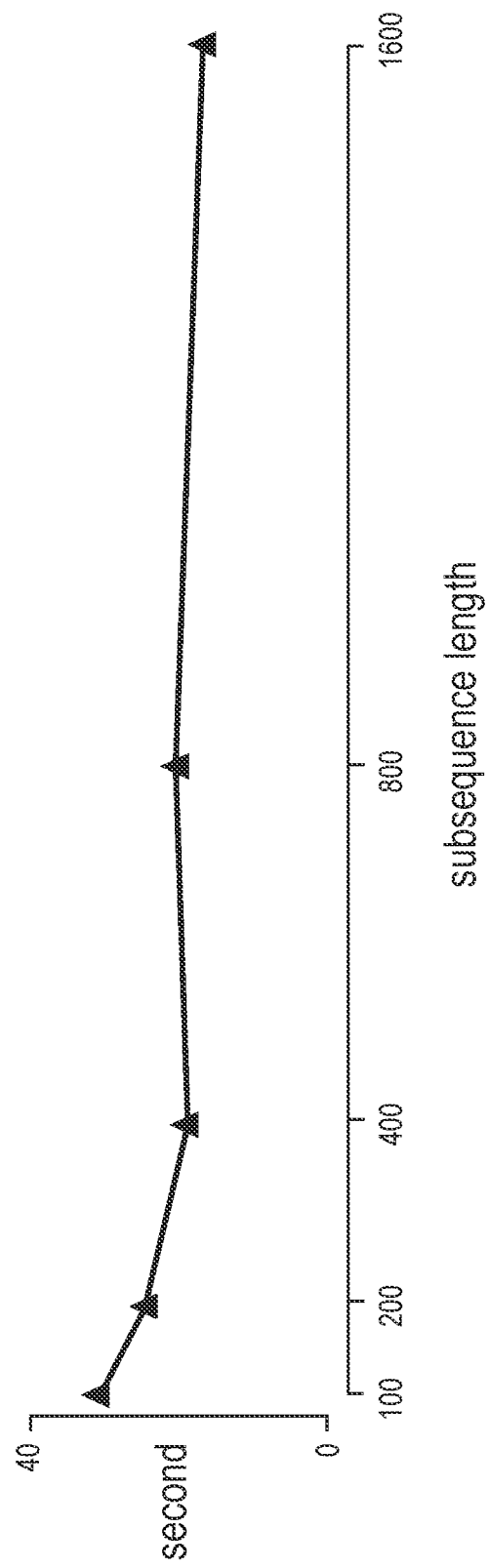
FIG. 19 shows a fourth dictionary join runtime graph of runtime vs. subsequence length according to embodiments.

FIG. 19 shows a fourth dictionary join runtime graph 1900 of runtime vs. subsequence length according to embodiments. The runtime of Algorithm 2 is measured for various subsequence lengths. The the length of both the dictionary building time series $T_B$ and the join time series $T_A$ is set to $2^{17}$ and the space saving factor is set to 0.5. Again, the behavior fo the fourth dictionary join runtime graph 1900 is similar to the behavior of the third dictionary building runtime graph 1600 of FIG. 16. In general, the runtime decreases as the subsequence length increases.

The approximate inter-similarity join's anomaly detection capability is evaluated using an electrocardiogram (ECG) time series from the MIT-BIH Long-Term ECG Database found in A. L. Goldberger, L. A. Amaral, L. Glass, J. M. Hausdorff, P. C. Ivanov, R. G. Mark, J. E. Mietus, G. B. Moody, C.-K. Peng, and H. E. Stanley, "Physiobank, physiotoolkit, and physionet: components of a new research resource for complex physiologic signals," circulation, vol. 101, no. 23, pp. e215-e220, 2000. For each patient, the first 1 million data points are used as the training time series, and the rest of the data points are used as the test time series. There are total of seven patients, and the length of the test time series varies across patients from 5 million to around 10 million. The training time series are processed by removing all abnormal heartbeats. Dictionaries are learned from the processed training time series under different space saving factors, then the resultant dictionaries are joined with the test time series. For the baseline of 0 space saving factor (e.g., an exact join), the processed training time series is directly joined with the test time series.

The inter-similarity join matrix profile value is used as the anomaly score for each subsequence, and the receiver operating characteristic curve (AUC) is computed to measure the quality of the anomaly score as compared to the ground truth labels. The AUC and throughput are computed using various space saving factors. To summarize the results from the seven total patients, the AUC percentage change is averaged and throughput is relative to the baseline (e.g., 0 space saving factor) for each one of the seven patients. Note, because both the AUC percentage change and the throughput are computed relative to the baseline, the AUC percentage change and throughput corresponding for the baseline are 0% and 1, respectively. The experiment results are summarized in FIG. 20.

Figure 20:
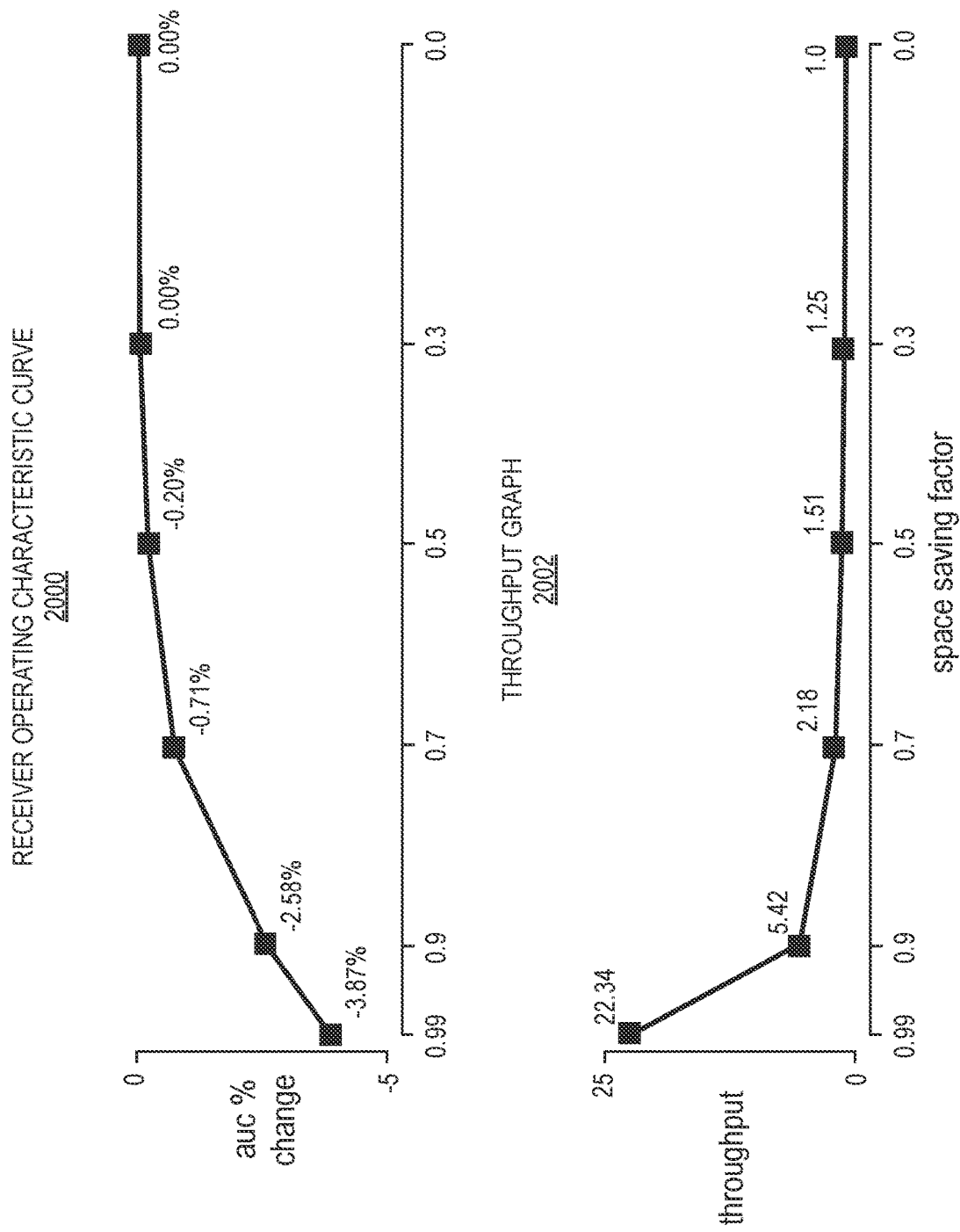
FIG. 20 shows a receiver operating characteristic curve and a throughput graph of an electrocardiogram time series according to embodiments.

FIG. 20 shows a receiver operating characteristic curve 2000 and a throughput graph 2002 of an electrocardiogram time series according to embodiments. The AUC decreases as the space saving factor is increased because there are less resources being used. However, even with 99% of the data removed, the AUC only drops 3.87% on average. When examining the corresponding average throughput, the throughput graph 2002 suggests that the approximate join algorithm is able to process 22.34 times more data compared to performing an exact join.

Figure 21:
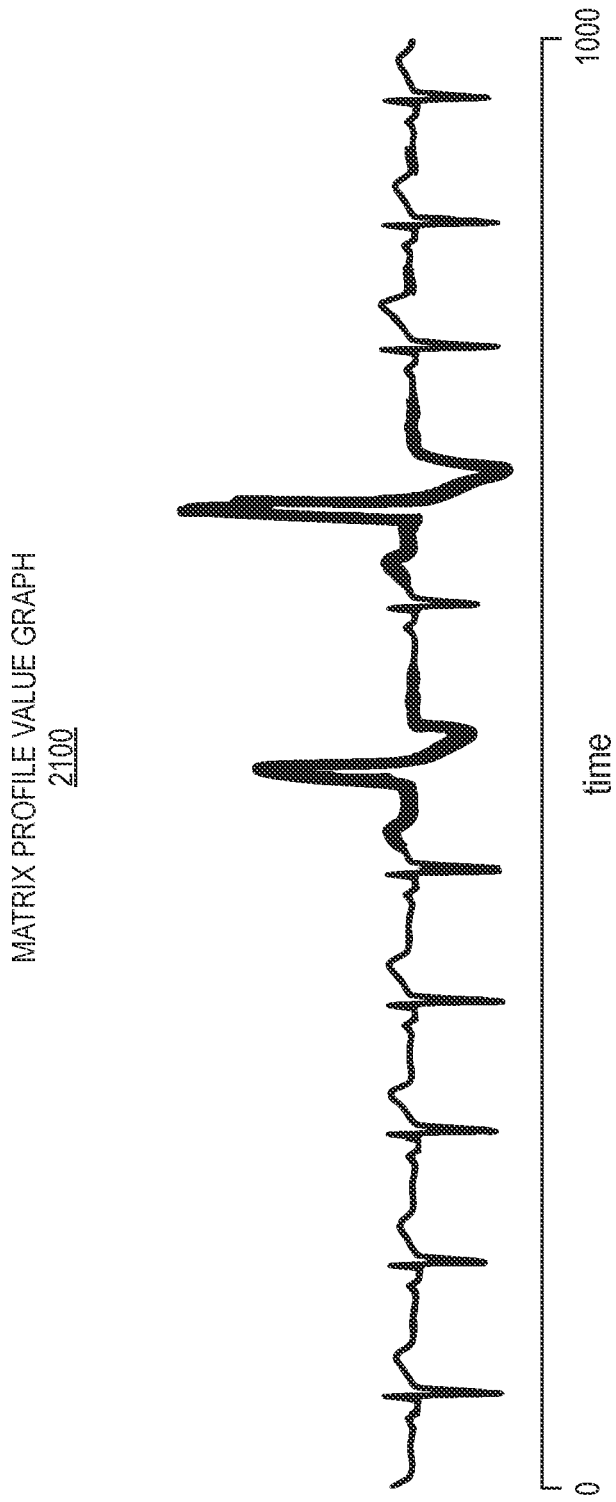
FIG. 21 shows anomalies in an electrocardiogram time series detected by an approximate join algorithm according to embodiments.

FIG. 21 shows anomalies in an electrocardiogram time series detected by an approximate join algorithm according to embodiments. An excerpt of the heartbeat time series from one of the patients and is taken, and the output of the approximate inter-similarity join (with a space saving factor of 0.99) is visualized by the matrix profile value graph 2100. In this heartbeat sequence, there are two premature ventricular contraction (PVC/abnormal) heartbeats, bold in the matrix profile value graph 2100, in addition to the normal heartbeats. From the matrix profile value graph 2100, one can observe that the two PVC heartbeats are associated with a high matrix profile value. In other words, the proposed approximate inter-similarity join, despite only using 1% of the training data, still provides quality anomaly scores.

Embodiments provide for several advantages. Embodiments improve the capability of an anomaly detection system using matrix profiles. Embodiments provide for an approximate inter-similarity join algorithm that is quantitatively more computationally efficient that previous methods. In addition, the approximate inter-similarity join algorithm provides for at least two beneficial guarantees. The approximate inter-similarity join algorithm provides the guarantee that no false negatives are computed in the inter-similarity join, allowing down-stream operations to use an approximate solution, yet produce exact answers by refining the approximate solution. Additionally, the approximate inter-similarity join algorithm provides the guarantee that there exists a maximum error in the approximated solution. Therefore, a discord in an approximate solution is a discord in the original time series when the maximum error is sufficiently small. The throughput of the approximate inter-similarity join algorithm is significantly larger than the throughput of exact similarity joins.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

Although some methods are described with steps occurring in a particular order, embodiments of the invention are not limited to the specific order of steps described or claimed. For example, in claim 1, step c) determining a length of a time series can occur before step b) in some embodiments and can still be encompassed by claim 1.

As used herein, the use of "a," "an," or "the" is intended to mean "at least one," unless specifically indicated to the contrary.

What is claimed is:

1. A method comprising:
   a) determining, by a server computer, a time series corresponding to time-dependent events;
   b) determining, by the server computer, a subsequence length;
   c) determining a length of the time series;
   d) computing, by the server computer, an initial matrix profile using the time series;
   e) forming, by the server computer, a processed matrix profile for a first subsequence of the subsequence length by applying the first subsequence to the initial matrix profile;
   f) determining, by the server computer, a second subsequence from the processed matrix profile;
   g) adding, by the server computer, the determined second subsequence to a dictionary comprising a subset of subsequences in the time series;
   h) generating, by the server computer, a plurality of subsequence matrix profiles by applying the subset of subsequences in the dictionary to the time series or another time series;
   i) forming, by the server computer, an approximate matrix profile by taking element-wise minimums of the plurality of subsequence matrix profiles; and
   j) determining one or more anomalies in the time series using the approximate matrix profile.

2. The method of claim 1 wherein the initial matrix profile is generated by:
   a-1) determining a subsequence of the time series;
   b-1) applying the subsequence to the time series to form a distance profile;
   c-1) repeating a)-1 and b)-1 for each subsequence in the time series; and
   d-1) forming the initial matrix profile using the distance profiles.

3. The method of claim 1, wherein steps e)-h) are repeated until all subsequences in the time series are processed.

4. The method of claim 1, wherein the determined second subsequence is added in the dictionary if the second subsequence or a subsequence substantially similar to the second subsequence is not stored in the dictionary.

5. The method of claim 1, wherein after f) determining the second subsequence from the processed matrix profile, the method further comprises:
   comparing, by the server computer, the second subsequence to other subsequences in the dictionary.

6. The method of claim 5, wherein as a result of comparing the second subsequence to the other subsequences in the dictionary results in combining the second subsequence with an overlapping subsequence in the dictionary.

7. The method of claim 1, wherein forming the approximate matrix profile using the plurality of subsequence matrix profiles comprises performing an element-wise minimum operation on the plurality of subsequence matrix profiles.

8. The method of claim 1, wherein j) determining one or more anomalies in the time series using the approximate matrix profile comprises determining a maximum value of the approximate matrix profile.

9. The method of claim 1, wherein the subsequence length corresponds to a length of a subsequence in the time series.

10. The method of claim 1, wherein the method further comprises determining a contextual window factor, wherein the contextual window factor is a value that adjusts the subsequence length.

11. The method of claim 1, wherein the plurality of subsequence matrix profiles are generated until a terminal condition is met.

12. The method of claim 11, wherein the terminal condition is based on a max error.

13. The method of claim 1, wherein the subsequence length is determined based upon a shape of the time series.

14. A server computer comprising:
    a processor; and
    a non-transitory computer readable medium comprising instructions executable by the processor to perform operations including:
    a) determining a time series corresponding to time-dependent events;
    b) determining a subsequence length;
    c) determining a length of the time series;
    d) computing an initial matrix profile using the time series;
    e) forming a processed matrix profile for a first subsequence of the subsequence length by applying the first subsequence to the initial matrix profile;
    f) determining a second subsequence from the processed matrix profile;
    g) adding the determined second subsequence to a dictionary comprising a subset of subsequences in the time series;
    h) generating a plurality of subsequence matrix profiles by applying the subset of subsequences in the dictionary to the time series or another time series;
    i) forming an approximate matrix profile by taking element-wise minimums of the plurality of subsequence matrix profiles; and
    j) determining one or more anomalies in the time series using the approximate matrix profile.

15. The server computer of claim 14, wherein the initial matrix profile is generated by:
- a-1) determining a subsequence of the time series;
- b-1) applying the subsequence to the time series to form a distance profile;
- c-1) repeating a)-1 and b)-1 for each subsequence in the time series; and
- d-1) forming the initial matrix profile using the distance profiles.

16. The server computer of claim 14, wherein the subsequence length corresponds to the length of a subsequence in the time series.

17. The server computer of claim 14, wherein generating the approximate matrix profile comprises using an inter-similarity join matrix profile between the plurality of subsequence matrix profiles.

18. The server computer of claim 14, wherein generating the plurality of subsequence matrix profiles includes applying the subset of subsequences in the dictionary to the time series.

* * * * *